United States Patent
Moriya

(10) Patent No.: US 7,149,423 B2
(45) Date of Patent: Dec. 12, 2006

(54) LENS APPARATUS DIAGNOSTIC SYSTEM, DIAGNOSTIC PROGRAM, RECORD MEDIUM, LENS DIAGNOSTIC SYSTEM AND CONTROLLER DIAGNOSTIC SYSTEM

(75) Inventor: Chikatsu Moriya, Saitama (JP)

(73) Assignee: Fujinon Corporation, Saitama (JP)

( * ) Notice: Subject to any disclaimer, the term of this patent is extended or adjusted under 35 U.S.C. 154(b) by 592 days.

(21) Appl. No.: 10/405,232

(22) Filed: Apr. 3, 2003

(65) Prior Publication Data

US 2003/0189640 A1    Oct. 9, 2003

(30) Foreign Application Priority Data

| Apr. 3, 2002 | (JP) | 2002-100867 |
| Apr. 3, 2002 | (JP) | 2002-100868 |
| Apr. 3, 2002 | (JP) | 2002-100869 |
| Apr. 3, 2002 | (JP) | 2002-100870 |

(51) Int. Cl.
  G03B 17/00   (2006.01)
  H04N 17/06   (2006.01)
  H04N 5/232   (2006.01)

(52) U.S. Cl. .................. 396/300; 348/187; 348/207.11

(58) Field of Classification Search .............. 396/88, 396/300, 287, 290; 348/187, 207.1, 207.11, 348/175, 176, 180
See application file for complete search history.

(56) References Cited

U.S. PATENT DOCUMENTS

| 4,423,934 A | * | 1/1984 | Lambeth et al. | 396/661 |
| 4,531,157 A |   | 7/1985 | Ishikawa | 348/352 |
| 4,843,557 A |   | 6/1989 | Ina et al. | 701/114 |
| 5,546,126 A | * | 8/1996 | Yajima et al. | 348/175 |
| 5,678,078 A | * | 10/1997 | Yasukawa | 396/208 |
| 6,058,268 A | * | 5/2000 | Maeno | 396/48 |
| 6,178,295 B1 |   | 1/2001 | Nakata et al. | 396/103 |
| 6,263,322 B1 |   | 7/2001 | Kirkevold et al. | 705/400 |
| 6,271,882 B1 |   | 8/2001 | Kawamura et al. | 348/335 |
| 2001/0047212 A1 | * | 11/2001 | Hewlett et al. | 700/2 |
| 2006/0002697 A1 | * | 1/2006 | Terashima | 396/85 |

FOREIGN PATENT DOCUMENTS

| EP | 0 416 171 A2 |   | 3/1991 |
| EP | 1 122 581 A2 |   | 8/2001 |
| EP | 1 146 734 A1 |   | 10/2001 |
| JP | 7-264449 A |   | 10/1995 |
| JP | 11328208 A | * | 11/1999 |
| JP | 2000 305003 A |   | 11/2000 |

* cited by examiner

Primary Examiner—W. B. Perkey
Assistant Examiner—Rishi Suthar
(74) Attorney, Agent, or Firm—Birch, Stewart, Kolasch & Birch, LLP

(57) ABSTRACT

The lens apparatus diagnostic system, the diagnostic program, the record medium, the lens diagnostic system and the controller diagnostic system have the effects of, by connecting a personal computer to a TV lens and having a diagnosis of the TV lens performed by the personal computer performing communication with the TV lens, implementing the diagnosis of the TV lens with an inexpensive system without necessity of providing a dedicated substrate for self-diagnosis to the TV lens and also capable of the diagnosis of an ENG lens. The personal computer is connected to the lens by an RS232C interface, and a program of an FIND system preinstalled on the personal computer is started. The FIND system allows a diagnostic mode for performing the diagnosis of the lens, a personal computer control mode for controlling the lens and so on to be selected, and the diagnosis of the lens is performed by the personal computer by selecting the diagnostic mode.

17 Claims, 23 Drawing Sheets

FIG.21

HISTORY DISPLAY SCREEN

"Result Details (R)" MENU
"Delete (D)" MENU

History
LENS Name
XA72
XA87

Serial Number | Date | Result
722116 | 1/17/2002/... | OK
| 1/21/2002/... | Error
Result Details(R)
Delete(D)

LENS MODEL NAME LIST FRAME

HISTORY LIST FRAME

FIG.23

| LENS MODEL NAME | SERIAL NUMBER | DATE | DIAGNOSTIC RESULTS | DIAGNOSTIC DETAILS |
|---|---|---|---|---|
| XA72 | 722116 | 1/17/2002 10:50:15 | OK | |
| | | 1/21/2002 14:10:34 | Error | Servo module (ESM) is not mounted. Otherwise, ESM... |
| XA87 | 013472 | 2/13/2002 16:32:56 | OK | |

LENS APPARATUS DIAGNOSTIC SYSTEM, DIAGNOSTIC PROGRAM, RECORD MEDIUM, LENS DIAGNOSTIC SYSTEM AND CONTROLLER DIAGNOSTIC SYSTEM

BACKGROUND OF THE INVENTION

1. Field of the Invention

The present invention relates to a lens apparatus diagnostic system, a diagnostic program, a record medium, a lens diagnostic system and a controller diagnostic system, and in particular, to a technology for diagnosing a lens apparatus and a controller with a computer such as a personal computer.

2. Description of the Related Art

TV lenses having a function of self-diagnosing the items such as a zoom lens, a focus lens, an iris, an extender and a power-supply voltage have been known so far. Japanese Patent Application Publication No. 7-264449 discloses a TV lens of this type, which is constituted by externally mounting a dedicated substrate for self-diagnosis on the TV lens as an option. The dedicated substrate has switches to be operated for performing the diagnosis, an A/D converter, an D/A converter, a storage device such as an ROM having a self-diagnostic program stored therein, a central processing unit (CPU) for diagnosing the items of the lens apparatus according to an input signal from the above described switches and a self-diagnostic program, and an interface such as RS232C for having diagnostic results displayed on an external personal computer and so on.

In addition, so far, there has been a known lens system which, on operating an operating member of a controller connected to the lens apparatus, a movable optical element of the lens apparatus such as the zoom lens or focus lens for instance is motor-driven to have a position or a speed corresponding to the setup position of the operating member. For instance, a zoom controller has a thumb ring which returns to a reference position in the case of no operation provided thereto, and a zoom speed changes according to an amount of operations from the reference position of the thumb ring.

There are the following problems as to the above-mentioned lens diagnostic system.

(1) There is a problem that, if the dedicated substrate for self-diagnosis is added to the lens apparatus, the lens apparatus becomes expensive and also becomes complicated and large-size. While a box-type TV lens for studio use and live telecast of sports is large enough to add the dedicated substrate, an ENG (Electric News Gathering) lens of a shouldered type used for news report is required to be lightweight and compact so that it has no self-diagnostic function because of no space for adding the dedicated substrate.

(2) When the above-mentioned zoom controller has the thumb ring set up at the reference position (in the case of no operation), a control signal of a determined center voltage (value) is sent to the lens apparatus, and an offset adjustment is made so that a zoom is not driven in the case of that center voltage. However, there are the cases where an error or an abnormality arises in the zoom controller, the drive member of the zoom, or other signal processing circuits (amplifier circuit and so on), and there is a possibility of occurrence of a problem that the zoom moves in spite of no operation of the thumb ring.

The lens diagnostic system in the past do not perform such a diagnosis of an offset so that, in the case where the above-mentioned problem occurs, it can recognize the abnormality but cannot identify the portion in which the abnormality is arising, and thus repair and adjustment thereof takes time and effort.

(3) In the case of having the diagnostic results displayed on an external personal computer and so on, it is possible to store the diagnostic results on a floppy disk, a hard disk and so on. To store the diagnostic results, however, it is necessary for an operator to specify a file name and a storage place, which is trouble. In addition, there is a problem that, if the operator changes, the storage place becomes unknown and so it becomes impossible to know when the diagnoses were performed in the past and the results thereof.

(4) The self-diagnosis in the past has a fault that it cannot diagnose an accessory (controller) connected to the TV lens and cannot know the abnormality of the controller even when there is one.

SUMMARY OF THE INVENTION

The present invention has been implemented in consideration of such circumstances, and an object thereof is to provide a lens apparatus diagnostic system, a diagnostic program and a record medium capable of implementing the diagnosis of the lens apparatus with an inexpensive system without adding the dedicated substrate for self-diagnosis to the lens apparatus and also capable of the diagnosis of an ENG type lens apparatus.

Another object is to provide a lens diagnostic system capable of performing an offset diagnosis in the case of driving the movable optical element to be in a state of corresponding to the setup position of the operating member and also identifying an abnormal portion so as to easily perform the repair and adjustment.

Further object is to provide the lens apparatus diagnostic system capable of automatically managing diagnostic history without bothering the operator so as to easily refer to the diagnostic results of the past.

Further object is to provide a controller diagnostic system capable of diagnosing whether or not there is the abnormality to the controller to be connected to the lens apparatus so as to prevent unanticipated situation due to a failure of the controller and so on.

In order to attain the above-described object, the present invention is directed to a lens apparatus diagnostic system comprising a lens apparatus having a detection device which detects information necessary for a diagnosis from each drive member of the lens apparatus, a first communication device which performs digital two-way communication, and a first control device which operates the drive members according to a control signal inputted via the first communication device and outputs the information detected by the detection device via the first communication device, and a computer having a second communication device which performs communication with the first communication device of the lens apparatus, a display device, a storage device which stores a diagnostic program, and a second control device which has the diagnostic program executed to operate each drive member of the lens apparatus and performs the diagnosis by gathering the information detected by the detection device so as to have diagnostic results thereof displayed on the display device.

According to the present invention, the diagnosis of the lens apparatus is performed by an external computer for performing two-way communication with the lens apparatus. Thus, it is not necessary to provide a dedicated substrate for self-diagnosis on the lens apparatus side, but it is only necessary to provide a communication function of performing the digital two-way communication with the computer and a function of operating according to the control signal inputted from the computer and on its operation, sending back to the computer the information necessary for the diagnosis of the drive members. The computer can be constituted by installing the diagnostic program on a general-purpose personal computer or the like. It is also possible to diagnose the lens apparatus in a remote place.

Preferably, the computer further includes a selection device which selects a diagnostic mode for diagnosing the lens apparatus or a control mode for externally controlling the lens apparatus, an operating portion for operating each drive member of the lens apparatus while in the control mode, and a device which outputs the control signal according to operation of the operating portion to the lens apparatus via the second communication device. According to the present invention, the computer can diagnose and also remotely control the lens apparatus.

Preferably, the computer further includes the device which outputs mode information for indicating which of the diagnostic mode and the control mode is selected by the selection device to the lens apparatus via the second communication device, and the lens apparatus is characterized in that it detects information necessary for a diagnosis from each drive member on determining it as the diagnostic mode according to the mode information inputted via the first communication device, and detects from each drive member only the information necessary for controlling the drive member on determining it as the control mode.

The computer sends the mode information for indicating which of the diagnostic mode and the control mode is selected by the selection device to the lens apparatus, and the lens apparatus performs a process in accordance with the received mode information.

According to the present invention, the lens apparatus detects the information necessary for the diagnosis and sends it to the computer in the case where the computer is in the diagnostic mode, and detects only the information necessary for controlling the drive member without detecting the information necessary for the diagnosis and sends it to the computer in the case where the computer is in the control mode. The information necessary for the diagnosis includes values of a voltage applied to the drive member and a current passed therein and so on, and it takes longer than an ordinary process for the lens apparatus to detect these values (to read a current value in particular). Thus, there is a possibility that lens control cannot be performed in real time if data not necessary for the process is read in the control mode, and so such data is not read so that it is read only in the diagnostic mode.

In order to attain the above-described object, the present invention is also directed to a diagnostic program applied to the computer having the second communication device which performs communication with the first communication device provided on the lens apparatus, the display device, and the storage device which stores the diagnostic program, wherein, on diagnosing the lens apparatus, the computer is caused to execute the functions of outputting via the second communication device the control signal for operating the drive member to be diagnosed of the lens apparatus, gathering via the second communication device the information necessary for the diagnosis detected on the lens apparatus side from the drive member having operated based on the control signal, diagnosing the drive member based on the gathered information, and having the diagnostic results of the diagnosis displayed on the display device.

The present invention is also directed to a record medium in which the diagnostic program and at least one of an instruction manual and a product brochure of the lens apparatus are recorded. It can be a removable record medium such as a CD-ROM.

In order to attain the above-described object, the present invention is also directed to a lens diagnostic system for performing an offset diagnosis of a lens drive apparatus having a control signal outputting device which outputs a control signal of a value according to a setup position of an operating member and a driving device which drives a movable optical element of the lens apparatus to be in a state corresponding to the value of the control signal, wherein the system has a control signal detection device which detects the value of the control signal outputted by the control signal outputting device, a follow signal outputting device which outputs a follow signal for indicating the state of the movable optical element, a first determination device which, in the state where the operating member is set up at a setup position determined to have the movable optical element set up in a predetermined state, determines whether or not the value of the control signal detected by the control signal detection device meets the condition of being within a range of standard values allowed as the values for setting up the movable optical element in the predetermined state, a second determination device which, in the state where the operating member is set up at a setup position determined to have the movable optical element set up in a predetermined state, determines whether or not the value of the follow signal outputted by the follow signal outputting device meets the condition of being within the range of the standard values allowed as the values for indicating the predetermined state of the movable optical element, and a diagnostic device which diagnoses it as normal in the case where both the first and second determination devices determine that the conditions are met, diagnoses the control signal outputting device as abnormal in the case where, of the first and second determination devices, at least the first determination device determines that the condition is not met, and diagnoses the driving device as abnormal in the case where, of the first and second determination devices, only the second determination device determines that the condition is not met.

In order to attain the above-described object, the present invention is also directed to a lens diagnostic system for performing the offset diagnosis of the lens drive apparatus having a control signal outputting device which outputs the control signal of the value according to the setup position of the operating member, a signal processing device which outputs an analog voltage signal of the voltage corresponding to the value of the control signal outputted from the control signal outputting device, and an analog driving device which receives the analog voltage signal and drives the movable optical element of the lens apparatus to be in the state corresponding to the voltage of the received analog voltage signal, wherein the system has the control signal detection device which detects the value of the control signal outputted by the control signal outputting device, the follow signal outputting device which outputs the follow signal for indicating the state of the movable optical element, an output voltage detection device which detects the voltage of the analog voltage signal outputted by the signal processing device, the first determination device which, in the state where the operating member is set up at the setup position determined to have the movable optical element set up in the predetermined state, determines whether or not the value of the control signal detected by the control signal detection device meets the condition of being within the range of the standard values allowed as the values for setting up the movable optical element in the predetermined state, the second determination device which, in the state where the operating member is set up at the setup position determined to have the movable optical element in the predetermined state, determines whether or not the value of the follow signal outputted by the follow signal outputting device meets the condition of being within the range of the standard values allowed as the values for indicating the predetermined state of the movable optical element, a third determination device which, in the state where the operating member is set up at the setup position determined to have the movable optical element set up in the predetermined state, determines whether or not the voltage detected by the output voltage detection device meets the condition of being within the range of the standard values allowed as the values for setting up the movable optical element in the predetermined state, and the diagnostic device which diagnoses it as normal in the case where all of the first, second and third determination devices determine that the conditions are met, diagnoses the control signal outputting device as abnormal in the case where, of the first, second and third determination devices, at least the first determination device determines that the condition is not met, diagnoses the signal processing device as abnormal in the case where the first determination device determines that the condition is met and, of the second and third determination devices, at least the third determination device determines that the condition is not met, and diagnoses the driving device as abnormal in the case where, of the first, second and third determination devices, only the second determination device determines that the condition is not met.

Preferably, the system has a changing device which changes a correspondence between the value of the control signal and the voltage of analog voltage signal in the signal processing device so that the voltage detected by the output voltage detection device is within the range of the standard values in the case where the first determination device determines that the condition is met and, of the second and third determination devices, at least the third determination device determines that the condition is not met.

Preferably, the system has a display device which displays the results of the diagnosis performed by the diagnostic device.

According to the present invention, the operating member is set up at a setup position determined to have the movable optical element set up in the predetermined state, and it is diagnosed whether or not there is an abnormality of the offset and in the case there is an abnormality, which portion is abnormal by determining whether the control signal, follow signal and so on are appropriate values at that time so as to easily obtain such information and alleviate the labor of the repair and adjustment.

In order to attain the above-described object, the present invention is also directed to a lens apparatus diagnostic system which diagnoses the lens apparatus has a data storage device which automatically records diagnostic results obtained by diagnosis of the lens apparatus as diagnostic history data at least with date information on a record medium, and records and stores the diagnostic history data of the diagnoses performed in past; a diagnostic history display instruction device which provides an instruction to display diagnostic history, and a diagnostic history list display device which, if instructed to display the diagnostic history by the diagnostic history display instruction device, reads the diagnostic history data of the past recorded and stored on the record medium by the data storage device from the record medium and list-displays the read diagnostic history data.

Preferably, the diagnostic history data includes identification of the diagnosed lens apparatus in addition to the diagnostic results and date information.

Preferably, the diagnostic results recorded and stored as the diagnostic history data by the data storage device have simple information and detailed information, and the diagnostic results list-displayed as the diagnostic history data by the diagnostic history list display device is the simple information so that the detailed information is displayed only when display of the detailed information is specified.

Preferably, the data storage device records and stores all the diagnostic history data of the diagnoses performed in the past as data in one file.

Preferably, the diagnostic history list display device list-displays the diagnostic history data for each type of the lens apparatus based on the identification of the lens apparatus.

Preferably, the diagnostic system has a computer which is connected to the lens apparatus and performs communication with the lens apparatus, and also performs the diagnosis by having a diagnostic program executed to operate each drive member of the lens apparatus and gathering the information necessary for the diagnosis from the lens apparatus, and the computer has the data storage device, the diagnostic history display instruction device and the diagnostic history list display device.

According to the present invention, the diagnostic results are automatically recorded on the record medium if the lens apparatus is diagnosed, which can eliminate the trouble of the operator creating the diagnostic history data and storing it by specifying a file name and a storage place. In addition, the recorded and stored diagnostic history data of the past can be list-displayed so that the diagnostic history of the past can be easily checked by any operator.

In order to attain the above-described object, the present invention is also directed to a controller diagnostic system comprising the lens apparatus, the controller which is connected to the lens apparatus and outputs the control signal for operating each drive member of the lens apparatus, and the computer which performs communication with the lens apparatus, the system diagnosing the controller with the computer, wherein the lens apparatus has the first communication device which sends to the computer the control signal inputted from the controller when diagnosing the controller, and the computer has the second communication device which performs communication with the first communication device of the lens apparatus, the display device, the storage device which stores the diagnostic program, and the control device which has the diagnostic program executed to diagnose the controller based on the control signal inputted from the controller via the lens apparatus so as to have the diagnostic results thereof displayed on the display device.

Preferably, the control device has the information for having an operating member of the controller operated in an interactive mode by the diagnostic program displayed on the display device.

In order to attain the above-described object, the present invention is also directed to a controller diagnostic system comprising of the lens apparatus, the controller which is connected to the lens apparatus and outputs the control signal for operating each drive member of the lens apparatus, and the computer which performs the communication with the lens apparatus, the system diagnosing the controller with the computer, wherein the lens apparatus has the first communication device which sends to the computer the control signal inputted from the controller when diagnosing the controller, and the computer has the second communication device which performs the communication with the first communication device of the lens apparatus, the display device, the storage device which stores the diagnostic program, and the control device which has the diagnostic program executed so as to have the state of the controller displayed on the display device based on the control signal inputted from the controller via the lens apparatus.

Preferably, if the above-described control device is an interactive-mode control device, the computer has a non-interactive-mode control device which has the diagnostic program executed to have the state of the controller displayed on the display device based on the control signal inputted from the controller via the lens apparatus, and a mode switching device which switches between control by the interactive-mode control device and control by the non-interactive-mode control device.

According to the present invention, it is possible to diagnose whether or not there is an abnormality in the controller and so on with the computer through the lens apparatus so as to prevent unanticipated situation due to a failure of the controller and so on. In the case where it is necessary to operate the operating member of the controller on diagnosing the controller, it is possible, by prompting the operator to operate it in the interactive mode, to have the computer determine the diagnostic results such as whether or not there is the abnormality. Even in the case of adopting no interactive mode, it is possible, by displaying the state of the controller on the display device, for the operator to operate an arbitrary operating member and check change in the state of the controller displayed on the display device so as to check whether or not there is the abnormality and so on.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 21 is a drawing showing the screen displayed in the case of right-clicking desired data in a history list frame;

FIG. 23 is a drawing showing a data structure of a file for storing diagnostic history data.

DETAILED DESCRIPTION OF THE PREFERRED EMBODIMENTS

Hereafter, a detailed description will be given according to the attached drawings as to a lens apparatus diagnostic system, a diagnostic program, a record medium, a lens diagnostic system and a controller diagnostic system related to the present invention.

Figure 1:
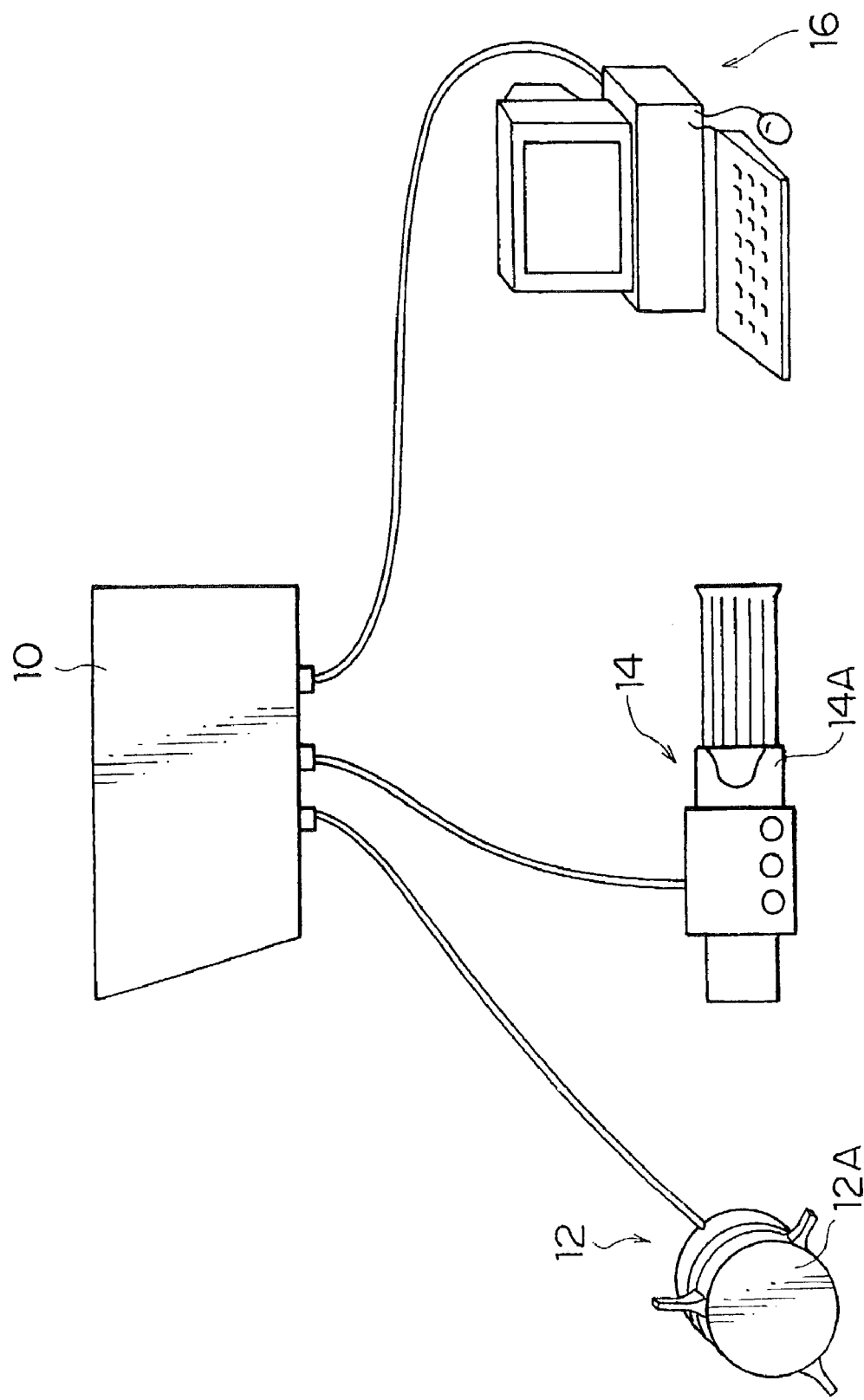
FIG. 1 is a drawing showing a state of connections of the apparatuses constituting a lens system for a TV camera to which the present invention is applied.
Figure 2:
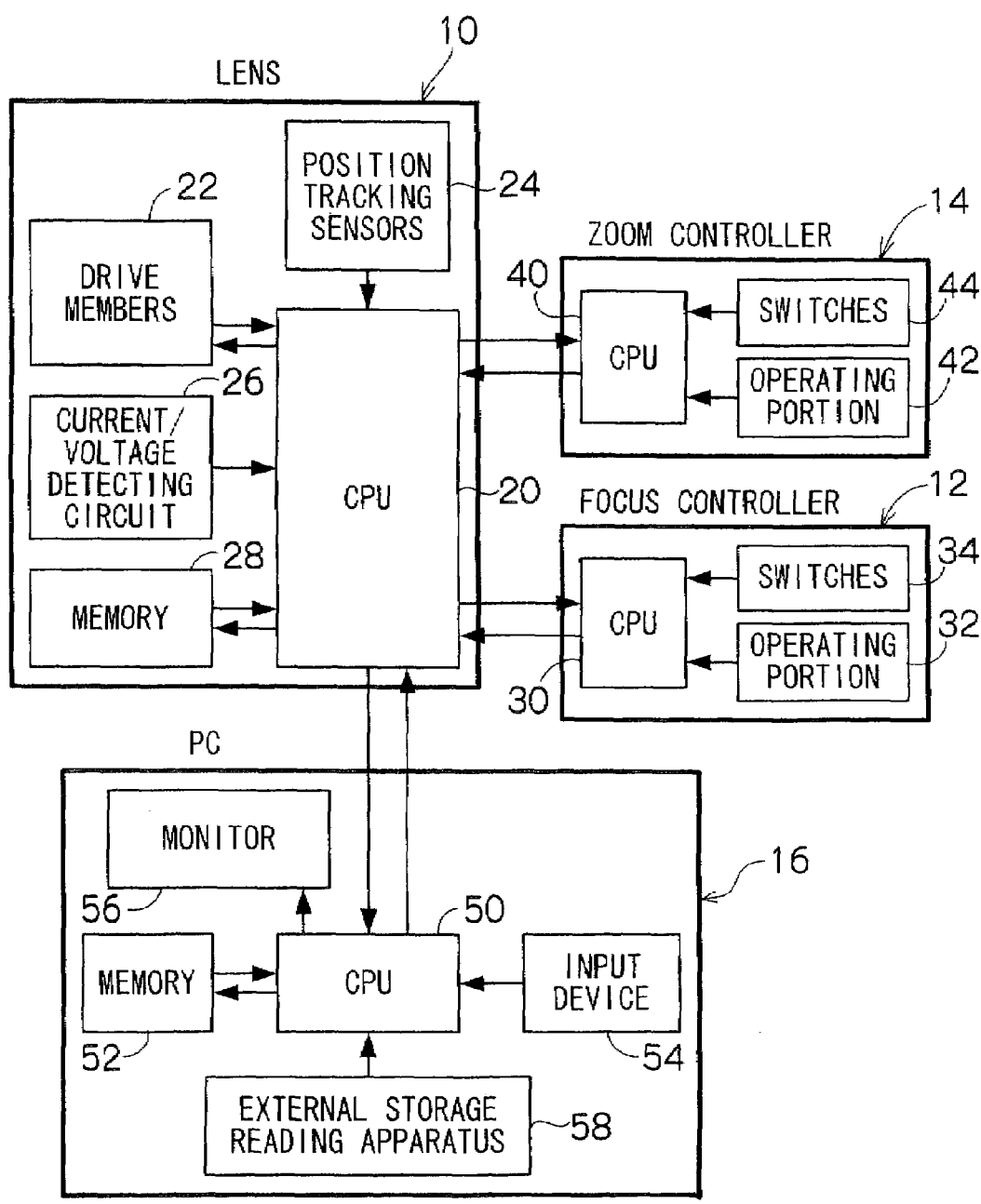
FIG. 2 is a block diagram showing a configuration of the lens system to which the present invention is applied.

FIG. 1 is a diagram showing a state of connections of the apparatuses constituting a lens system for a TV camera to which the present invention is applied, and FIG. 2 is a diagram showing a configuration of the lens system to which the present invention is applied. In the lens system shown in FIG. 1, a TV lens 10 is a box-type lens apparatus called an EFP lens for instance, which is mounted on a TV camera body (not shown) by means of a lens mount. The TV lens 10 can have a focus controller 12, a zoom controller 14, a PC (Personal Computer) 16 and so on connected thereto by cables. Moreover, the present invention is also applicable to the lens systems using other types of lenses such as a portable ENG lens instead of the EFP lens.

The TV lens 10 (hereafter, merely referred to as lens 10) is equipped with a taking lens for focusing a subject image onto a face of an image pickup device of the TV camera proper. As for movable optical elements constituting the taking lens, a focus lens for focus adjustment, a zoom lens for zoom adjustment, an iris for diaphragm adjustment, and an extender for extending and contracting a zoom magnification such as 1× to 2× or 2× to 1× are placed for instance.

As shown in FIG. 2, the lens 10 has a CPU 20 mounted thereon and also has drive members 22 for motor-driving the movable optical elements mounted thereon, where each drive member 22 drives a motor based on a control signal provided from the CPU 20 so as to drive each of the movable optical elements. Of the drive members 22, in the case of identifying the respective drive members and referring to the drive member for driving the focus lens and the drive member for driving the zoom lens and so on, they are referred to as a focus drive member, a zoom drive member and so on. There are also the cases where each drive member comprises an apparatus having a motor called a servo module which is detachable from the lens 10 and a servo circuit for servo-controlling the motor mounted thereon.

The lens 10 also has position tracking sensors 24 for detecting positions of the movable optical elements and a current/voltage detecting circuit 26 for detecting the currents and voltages provided from a power supply to each drive member 22 mounted thereon, where detected values (position detection values) of the position tracking sensors 24 and the detected values of the current/voltage detecting circuit 26 are appropriately read by the CPU 20. The lens 10 is also equipped with a memory 28 for having required data written thereto or read therefrom by the CPU 20.

As shown in FIG. 2, the focus controller 12 has a CPU 30 mounted there on. If the focus controller 12 is connected to the lens 10 by the cable as shown in FIG. 1, various signals can be exchanged by communication (two-way communication) between the CPU 30 of the focus controller 12 and the CPU 20 of the lens 10 via an interface circuit (not shown).

As shown in FIG. 1, the focus controller 12 also has a rotatable focus ring 12A to be used by a cameraperson for manual adjustment of a focus position (focus lens position) provided thereto, and the detected value according to the rotating position (setup position) of the focus ring 12A is given to the CPU 30 from the position tracking sensor such as a potentiometer. FIG. 2 shows as an operating portion 32 a component portion comprising operating members other than the switches provided to the focus controller 12 and the position tracking sensor for detecting setup positions of the operating members, where the focus ring 12A and the position tracking sensor for detecting the setup position thereof are included in the operating portion 32.

In the case of having a focus of the lens 10 adjusted by the focus controller 12, the CPU 30 of the focus controller 12 sends to the CPU 20 of the lens 10 the control signal for, based on the setup position (detected value) of the focus ring 12A obtained from the operating portion 32, issuing an order to move to the focus position corresponding to the setup position. The CPU 20 of the lens 10 drives the drive member of the focus according to the control signal received from the focus controller 12 so as to move the focus lens to the focus position ordered by the focus controller 12.

There are also the cases where various switches 34 are mounted on the focus controller 12 in order to use specific functions (there are also the cases of the switches unrelated to control of the focus), and in such cases, the setup position of each switch 34 is read by the CPU 30. Furthermore, there are also the cases where an applicable operating member and its position tracking sensor other than the focus ring 12A are set up in the operating portion 32 in FIG. 2, and in such cases, the setup position of the operating member is also read by the CPU 30. A description is omitted as to a process based on a setup state of the operating portion 32 and each switch 34. However, a command signal and so on based on the setup state of the operating portion 32 other than the focus ring 12A and each switch 34 are also sent to the lens 10 from the CPU 30 of the focus controller 12 by means of the communication with the lens 10.

As shown in FIG. 2, the zoom controller 14 has a CPU 40 mounted there on. If the zoom controller 14 is connected to the lens 10 by the cable as shown in FIG. 1, various signals can be exchanged by the communication (two-way communication) between the CPU 40 of the zoom controller 14 and the CPU 20 of the lens 10 via the interface circuit (not shown).

As shown in FIG. 1, the zoom controller 14 also has a rotatable thumb ring 14A to be used by the cameraperson for manual adjustment of a zoom speed (zoom lens moving speed) provided thereto, and the detected value according to the rotating position (setup position) of the thumb ring 14A is given to the CPU 40 from the position tracking sensor such as the potentiometer. The thumb ring 14A returns to a predetermined reference position in a state where no operation is performed by the cameraperson. FIG. 2 shows as an operating portion 42 the component portion comprising operating members other than the switches provided to the zoom controller 14 and the position tracking sensor for detecting the setup positions of the operating members, where the thumb ring 14A and the position tracking sensor for detecting the setup position thereof are included in the operating portion 42.

In the case of having the zoom of the lens 10 adjusted by the zoom controller 14, the CPU 40 of the zoom controller 14 sends to the CPU 20 of the lens 10 the control signal for, based on the setup position (detected value) of the thumb ring 14A obtained from the operating portion 42, issuing an order to move at the zoom speed corresponding to the setup position. The CPU 20 of the lens 10 drives the drive member of the zoom according to the control signal received from the zoom controller 14 so as to move the zoom lens at the zoom speed ordered by the zoom controller 14.

There are also the cases where various switches 44 are mounted on the zoom controller 14 in order to use the specific functions (there are also the cases of the switches unrelated to the control of the zoom), and in such cases, the setup position of each switch 44 is read by the CPU 40. Furthermore, there are also the cases where an applicable operating member and its position tracking sensor other than the thumb ring 14A are set up in the operating portion 42 in FIG. 2, and in such cases, the setup position of the operating member is also read by the CPU 40. A description is omitted as to contents of the process based on the setup state of the operating portion 42 and each switch 44. However, the command signal and so on based on the setup state of the operating portion 42 other than the zoom ring 14A and its position tracking sensor and each switch 44 are also sent to the lens 10 from the CPU 30 of the zoom controller 14 by means of the communication with the lens 10.

Figure 3:
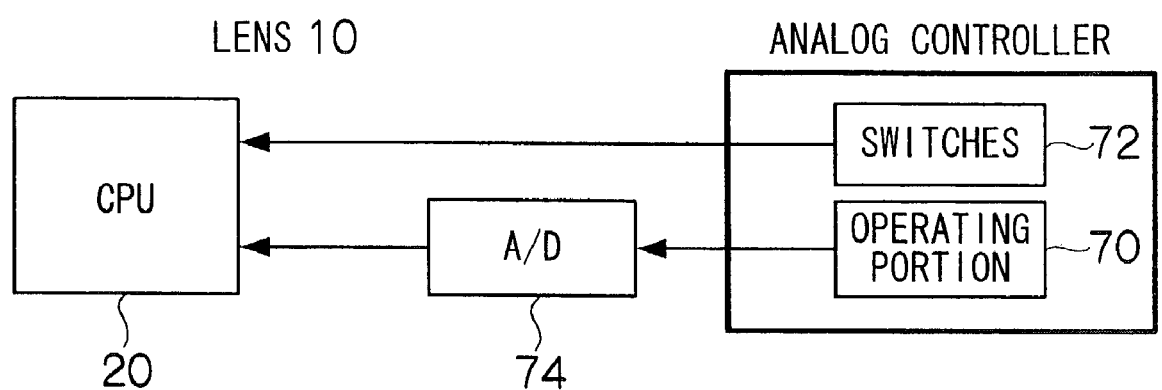
FIG. 3 is a drawing showing the configuration in the case of sending a signal from an analog controller to a lens.

The above-mentioned focus controller 12 and the zoom controller 14 are digital, and the information on the operating portions 32, 42 and the switches 34, 44 thereof is sent to the lens 10 by the digital signal. As opposed thereto, an analog controller has no special communication function, and as shown in FIG. 3, the information of an operating portion 70 provided to the controller is sent as an analog signal to the lens 10, converted into the digital signal by an A/D converter 74 and read by the CPU 20 of the lens 10, while the information of switches 72 provided to the controller is directly read by the CPU 20 of the lens 10. The present invention is applicable even if the focus controller 12 and the zoom controller 14 are such analog controllers.

A PC 16 shown in FIG. 1 is commercially available, and comprises a PC proper, a monitor, a keyboard, a mouse and so on, for instance. FIG. 2 simply shows the configuration of the PC 16, where the PC 16 comprises a CPU 50, a memory 52 (a hard disk, an RAM, an ROM and so on), an input device 54 (a keyboard, a mouse and so on), a monitor 56, an external storage reading apparatus 58 (a CD-ROM driver, a floppy disk driver and so on) and so on.

The PC 16 and the lens 10 are connected by an RSC232C cable for instance so that the communication (two-way communication) can be performed between the CPU 50 of the PC 16 and the CPU 20 of the lens 10 through an interface circuit (not shown) by the interface of the RSC232C. As described in detail later, it is also possible, by installing software of the FIND system (the software is named FIND, and the program thereof is called the FIND program) on the PC 16 in advance, to perform the control, diagnosis and so on of the lens 10 described in detail later on the PC 16.

For instance, in the case of controlling the lens 10 on the PC 16, a PC control screen is displayed on the monitor by activating the FIND program and selecting a PC control mode. The PC control screen has an operation screen for operating the respective setup positions of the zoom, focus, iris and extender and so on with the mouse displayed thereon, for instance. According to the setup on the operation screen, the control signals for the zoom, focus, iris and extender are sent to the CPU 20 of the lens 10 from the CPU 50 of the PC 16 as with an ordinary controller. The CPU 20 of the lens 10 drives the drive members of the zoom, focus, iris and extender according to the control signal received from the PC 16. Thus, the PC 16 controls the lens 10.

A description will be given as to the processing of the FIND system constructed by the software of the PC 16 in the lens system constituted as described above.

1. Installation of the FIND System Software (FIND)

If a FIND system CD is inserted into the CD-ROM driver (external storage reading apparatus 58) of the PC 16 on which a predetermined OS (Windows® for instance in this embodiment) is installed, a FIND system CD browser automatically starts. And the FIND system software ("FIND") is installed on the PC 16 according to the instructions on the screen. On completion of the installation, a shortcut icon of "FIND" is created on a desktop. Moreover, the FIND system CD includes the information on the TV lens such as instruction manual and product brochure information in addition to the FIND system software, so that such information can also be installed on the PC 16.

2. Starting the FIND System

Figure 4:
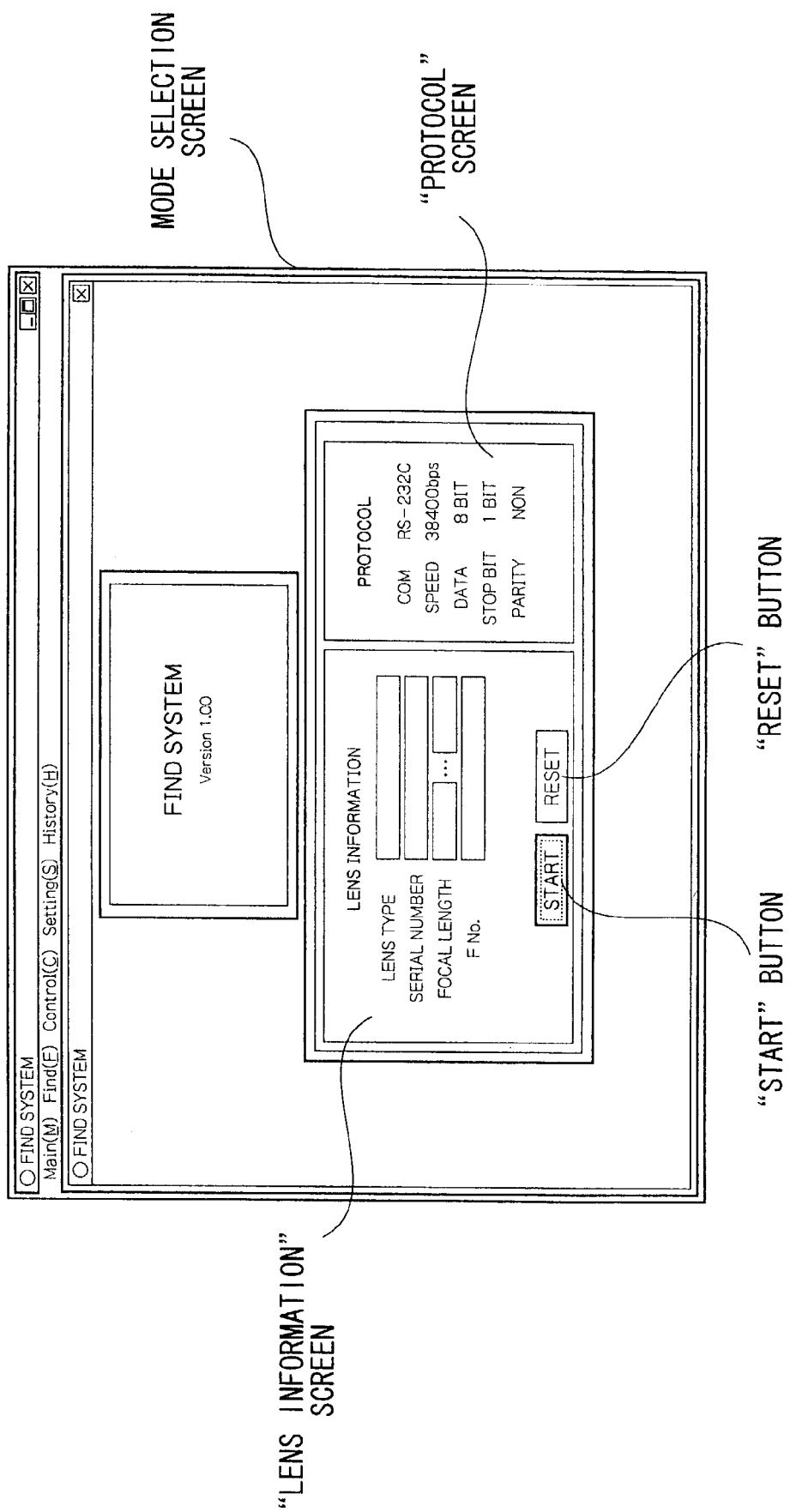
FIG. 4 is a drawing showing an initial screen of a FIND system.

To start the FIND system, a shortcut to "FIND" should be double-clicked on the desktop. An initial screen of the FIND system as in FIG. 4 is thereby started. The initial screen comprises a mode selection screen and the "LENS INFORMATION" screen and so on displayed in that screen.

3. Connection Process

Figure 5:
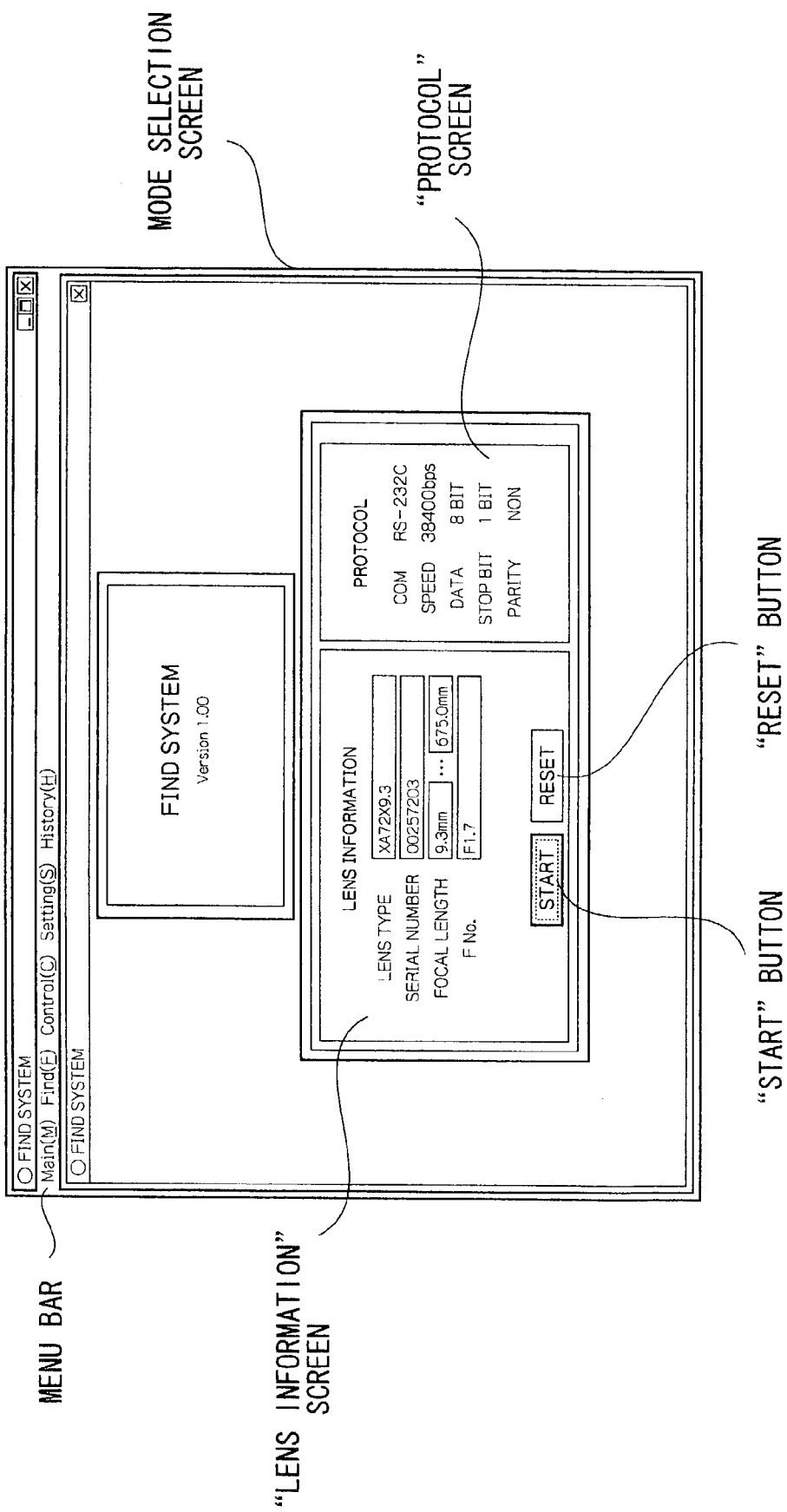
FIG. 5 is a drawing showing a screen displayed after a connection process.

If the "START" button on the "LENS INFORMATION" screen is clicked with the mouse, initialization is performed so that the lens 10 is connected to the PC 16 to be capable of the communication, and the information sent from the lens 10 is displayed on the "LENS INFORMATION" screen as shown in FIG. 5. In the case of performing the initialization again after finishing the initialization or in the case where the initialization is not finished normally, the initialization is performed again by clicking the "RESET" button on the "LENS INFORMATION" screen. Communication format information is displayed on the "PROTOCOL" screen in the drawing. In the case of the lens of a type which cannot automatically obtain lens information, the lens information is inputted by using the keyboard of (input device 54) of the PC 16.

4. Mode Selection

For instance, after the connection process, if "Find (F)" on the menu bar is clicked with the mouse on the mode selection screen in FIG. 5 and "Find Start" in the menu is selected, a diagnostic mode for diagnosing an operating state, whether or not there is an abnormality and so on as to the lens 10 can be selected. If "Control (C) on the menu bar is clicked and "Control Start" in the menu is selected, a PC control mode for controlling the lens 10 with the PC 16 can be selected. If "History (H) on the menu bar is clicked and "History List (L)" in the menu is selected, a diagnostic history display mode for displaying past diagnostic history can be selected.

Figure 6:
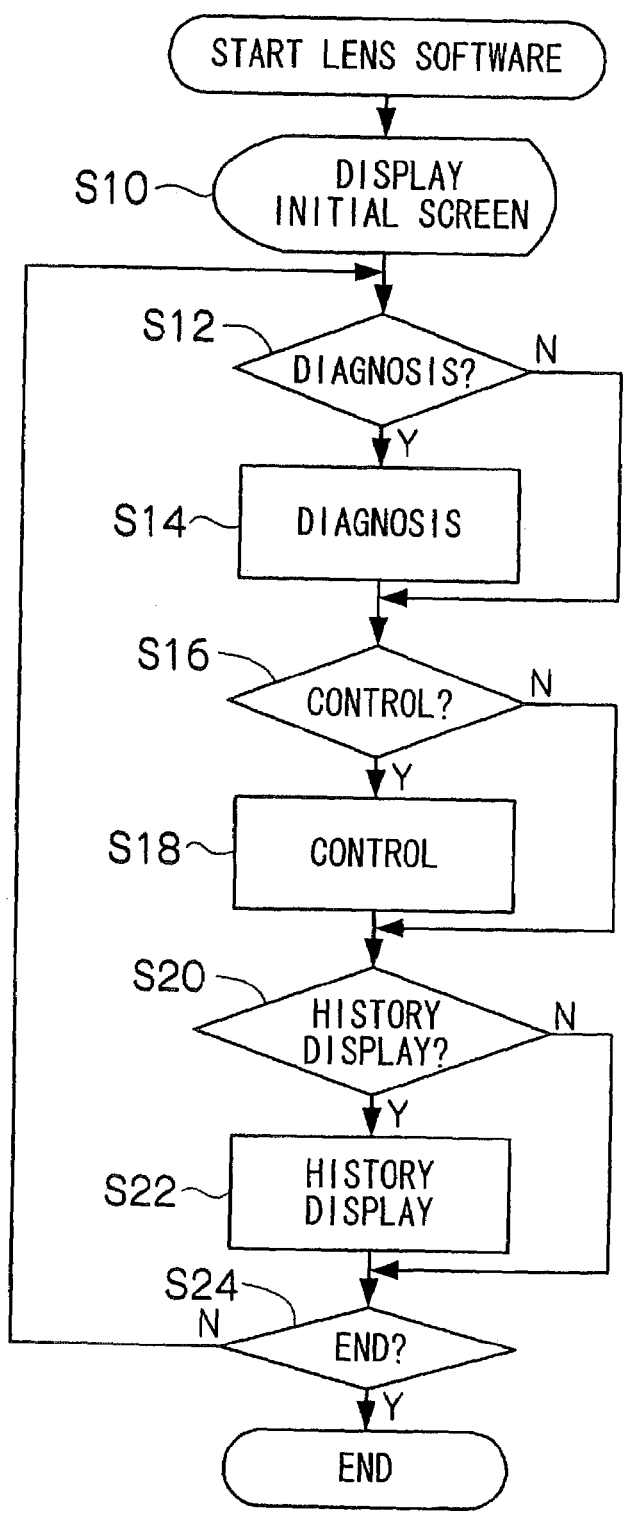
FIG. 6 is a flowchart showing a mode selection process in a CPU of a PC.

To briefly describe the mode selection process in the CPU 50 of the PC 16 by using the flowchart in FIG. 6, the CPU 50 first starts the FIND program and displays the initial screen as in FIGS. 4 and 5 on the monitor 56 (step S10). And it determines whether or not the diagnostic mode was selected (step S12), and performs the process of the diagnostic mode if determined as YES (step S14). It does not perform the process of the diagnostic mode if determined as NO.

Next, it determines whether or not the PC control mode was selected (step S16), and performs the process of the PC control mode if determined as YES (step S18). It does not perform the process of the PC control mode if determined as NO.

Next, it determines whether or not the diagnostic history display mode was selected (step S20), and performs the process of the diagnostic history display mode if determined as YES (step S22). It does not perform the process of the diagnostic history display mode if determined as NO. And it determines whether or not the end of the FIND program was selected (step S24), and repeats the process from the step S12 if determined as NO, and finishes the FIND program if determined as YES.

5. Diagnostic Mode

Figure 7:
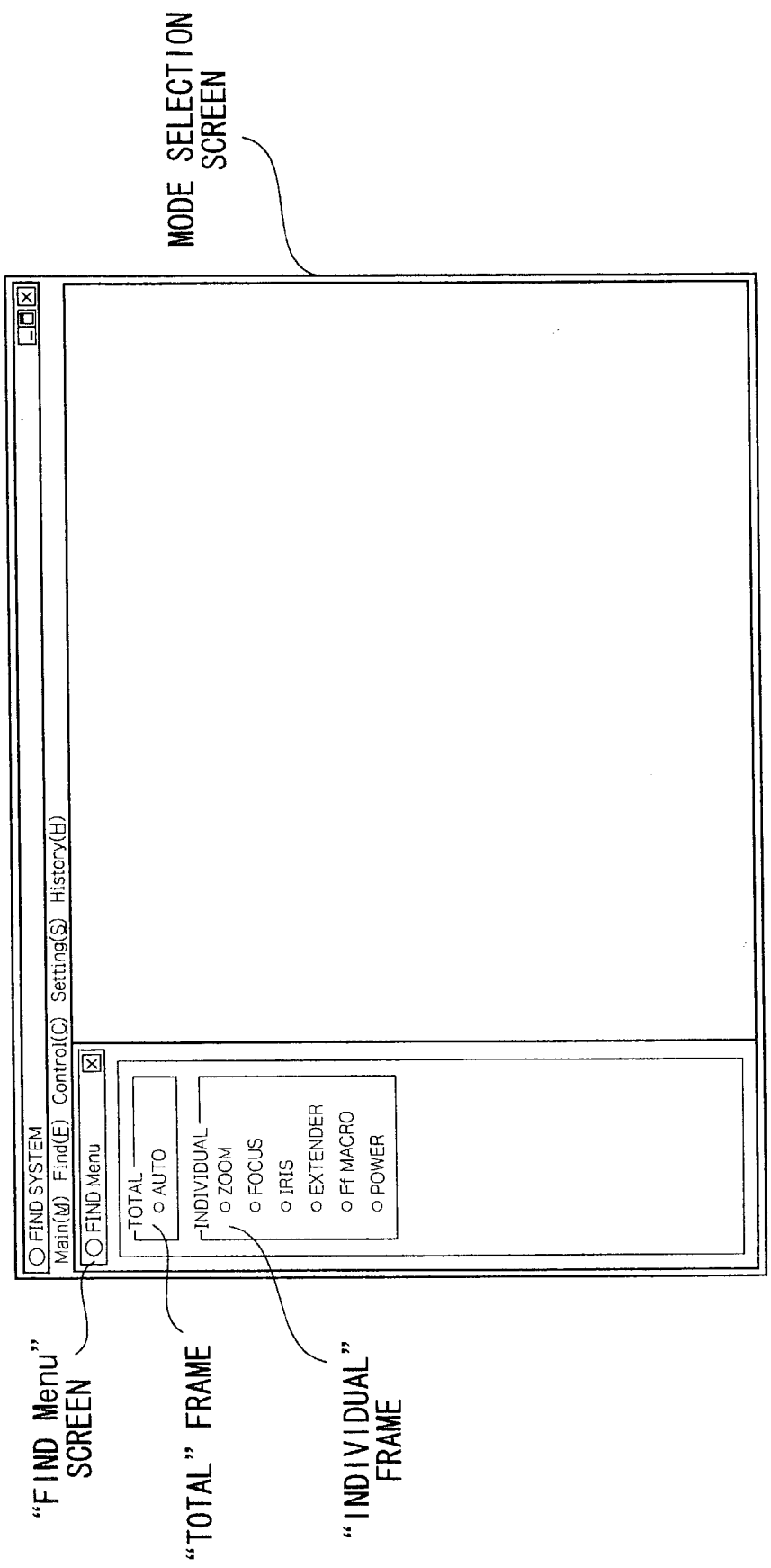
FIG. 7 is a drawing showing the initial screen displayed in the case of selecting a diagnostic mode.

As described above, if "Find (F)" on the menu bar is clicked on the mode selection screen and "Find Start" in the menu is selected, the diagnostic mode for diagnosing the operating state, whether or not there is the abnormality and so on as to the lens 10 is selected, and the "Find Menu" screen is displayed in the mode selection screen as shown in FIG. 7.

Here, a "TOTAL" frame and an "INDIVIDUAL" frame are displayed on the "FIND Menu" screen so that a desired diagnostic method can be selected, of automatic execution and individual execution, by selecting an item in one of the frames.

In the case where the automatic execution is selected, the diagnoses of the items of the zoom, focus, iris, extender, advanced back focus (only in the case where the lens has the function), power-supply voltage and others (only in the case where the lens has the function) are successively and automatically performed. When all the diagnoses are finished, the diagnostic results of the items are displayed on the monitor.

In the case where the individual execution is selected, the diagnoses of the items of the zoom, focus, iris, extender, advanced back focus (only in the case where the lens has the function), power-supply voltage and others (only in the case where the lens has the function) are individually performed. It is also possible to check the zoom controller and focus controller.

Hereafter, the automatic execution and individual execution of the diagnostic mode will be described in order.

5.1 Automatic Execution 5.1.1 Diagnosis of the Automatic Execution

If the "AUTO" item is selected in the "TOTAL" frame on the "Find Menu" screen in FIG. 7, the automatic execution process is started. To be more specific, the diagnoses of the items of the zoom, focus, iris, extender, power-supply voltage and so on are successively and automatically performed. The FIND system automatically recognizes the functions accompanying the lens 10 connected to the PC 16 so that the diagnosis is only performed as to the diagnostic items corresponding to the functions of the lens 10.

The state of the lens 10 is graphically represented in real time during execution of the diagnosis, and if the diagnosis is finished, the diagnostic results are shown in three colors of green (normal), yellow (adjustment required) and red (repair required) below the graph. And the diagnosis of a next item is started at approximately one second after the display of the diagnostic results of one item.

Here, the process during the execution of the diagnosis in the PC 16 and the lens 10 will be described. The CPU 50 of the PC 16 provides to the CPU 20 of the lens 10 the control signal for ordering the operation of the lens 10 for the sake of executing the diagnoses of the items, and the drive member of the lens 10 is driven based on the control signal. During the diagnostic operation, the information necessary for the diagnosis such as the detected values of the position tracking sensors 24 and the current/voltage detecting circuit 26 (refer to FIG. 2) is read one after another by the CPU 20 of the lens 10. For instance, a part of the information (a detected position value of the position tracking sensor 24 for instance) is sent to the PC 16 in real time to display the information on the monitor 56 of the PC 16 in real time, and other information (a detected current value of the current/ voltage detecting circuit 26 for instance) is temporarily stored in the memory 28 of the lens 10. If the diagnostic operation of one unit is finished, the information such as the detected values stored in the memory 28 of the lens 10 is sent to the PC 16, where the diagnostic results are determined by the CPU 50 of the PC 16 based on the information obtained during or after diagnostic operation so that the diagnostic results will be displayed on the monitor 56 of the PC 16.

To concretely describe an example of the diagnosis of the zoom, in order to operate the zoom for the diagnosis, the control signal for ordering the zoom to be moved from a Wide-end to a Tele-end at a maximum speed is sent to the CPU 20 of the lens 10 from the CPU 50 of the PC 16. The drive member of the zoom is accordingly driven so that the zoom (zoom lens) is moved from the Wide-end to the Tele-end at the maximum speed.

During the move, the CPU 20 of the lens 10 reads the detected position value on the zoom from each position tracking sensor 24 (refer to FIG. 2) one after another to send the detected position value to the PC 16 in real time, and also reads the current value (detected current value) provided to the drive member of the zoom from the current/voltage detecting circuit 26 (refer to FIG. 2) to temporarily store the current value in the memory 28. If the zoom reaches the Tele-end and the drive of the drive member of the zoom stops, the CPU 20 of the lens 10 reads the current value stored in the memory 28 to send it to the PC 16.

Figure 8:
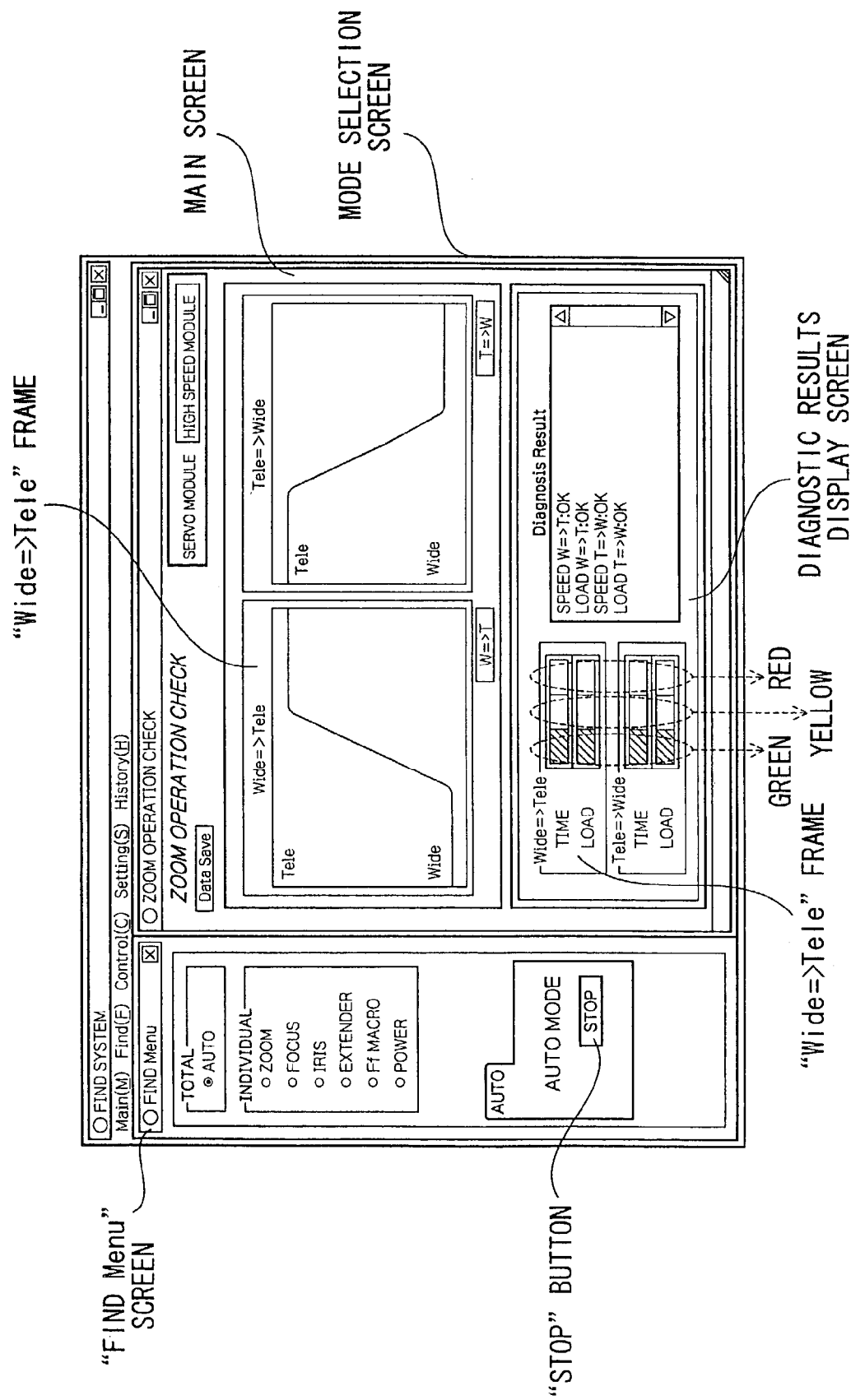
FIG. 8 is a drawing showing the screen displayed in the case of selecting automatic execution in the diagnostic mode.

The CPU 20 of the PC 16 displays the screen as shown in FIG. 8 on the monitor 56, and graphically represents the detected position value obtained from the lens 10 on a "Wide=>Tele" frame on the main screen thereof in real time.

The CPU 20 of the PC 16 determines based on the detected position value that the zoom was moved from the Wide-end to the Tele-end, detects operation time required for the move of the zoom from the Wide-end to the Tele-end, and also detects the load required for the move based on the current value obtained from the lens 10. And it determines whether the detected operation time and load are normal or in a state requiring adjustment or in a state requiring repair respectively. The CPU 50 obtains the operation time and load in the case of being determined as normal from lens data created as a database in advance so as to perform the determination by making a comparison with that data.

If the determination is performed, the diagnostic results are displayed by a lighting position and a lighting color beside the "TIME" item and "LOAD" item in the "Wide=>Tele" frame at the upper left of the diagnostic results display screen in FIG. 8. For instance, three rectangular display frames are placed in a single horizontal row for each of the "TIME" item and "LOAD" item so that the inside of the leftmost display frame is lighted in green if determined as normal, the inside of the central display frame is lighted in yellow if determined as the state requiring the adjustment, and the rightmost display frame is lighted in red if determined as the state requiring the repair. In addition, the diagnostic results are represented in characters on the right side of the diagnostic results display screen.

The same process as described above is performed by moving the zoom from the Tele-end to the Wide-end at the maximum speed so as to finish the diagnosis of the zoom. The automatic execution is stopped by clicking a "STOP" button displayed at the bottom of the "Find Menu" screen.

5.1.2 Display of the Diagnostic Results

Figure 9:
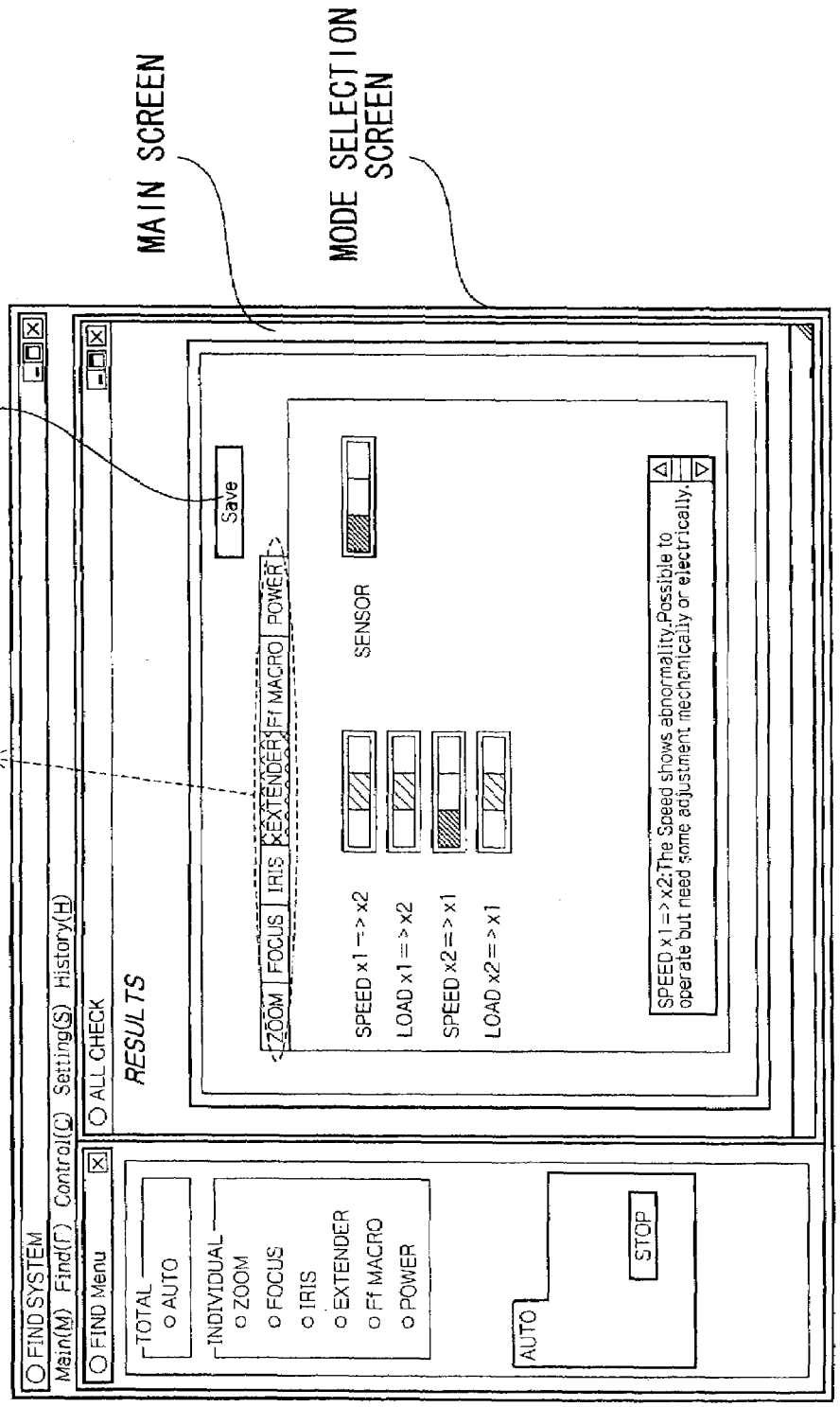
FIG. 9 is a drawing showing the screen on which diagnostic results are displayed after finishing the automatic execution in the diagnostic mode.

If all the diagnoses of the items of the zoom, focus, iris, extender, power-supply voltage and so on in the automatic execution are finished, the diagnostic results are displayed as shown on the main screen in FIG. 9. In the case where all the diagnosed items are normal, "ALL OK" (not shown) is displayed at the upper left of the main screen. In the case where any of the items is abnormal, the color of that item tag changes and is displayed on the front. In the case where there are two or more abnormal items, the operator checks the contents of each of them by appropriately switching the item tag with the mouse.

5.1.3 Storage of the Automatic Execution Diagnostic Results Data

It is possible to store the data of the diagnostic results obtained by the process of the automatic execution in a predetermined file format (a file format such as MS Excel). For instance, if a "Save" button is clicked with the mouse on the main screen in FIG. 9, the screen for specifying a place and a file name for storage is displayed so that, by specifying them, the data of the diagnostic results are stored with a specified name in a specified place. In the case where there is an abnormality as to any diagnostic item, the data file should be sent to a service representative of the manufacturer by e-mail or the like so that a detailed analysis will be performed by the manufacturer.

5.1.4 Processing of the PC in the Automatic Execution

Figure 10:
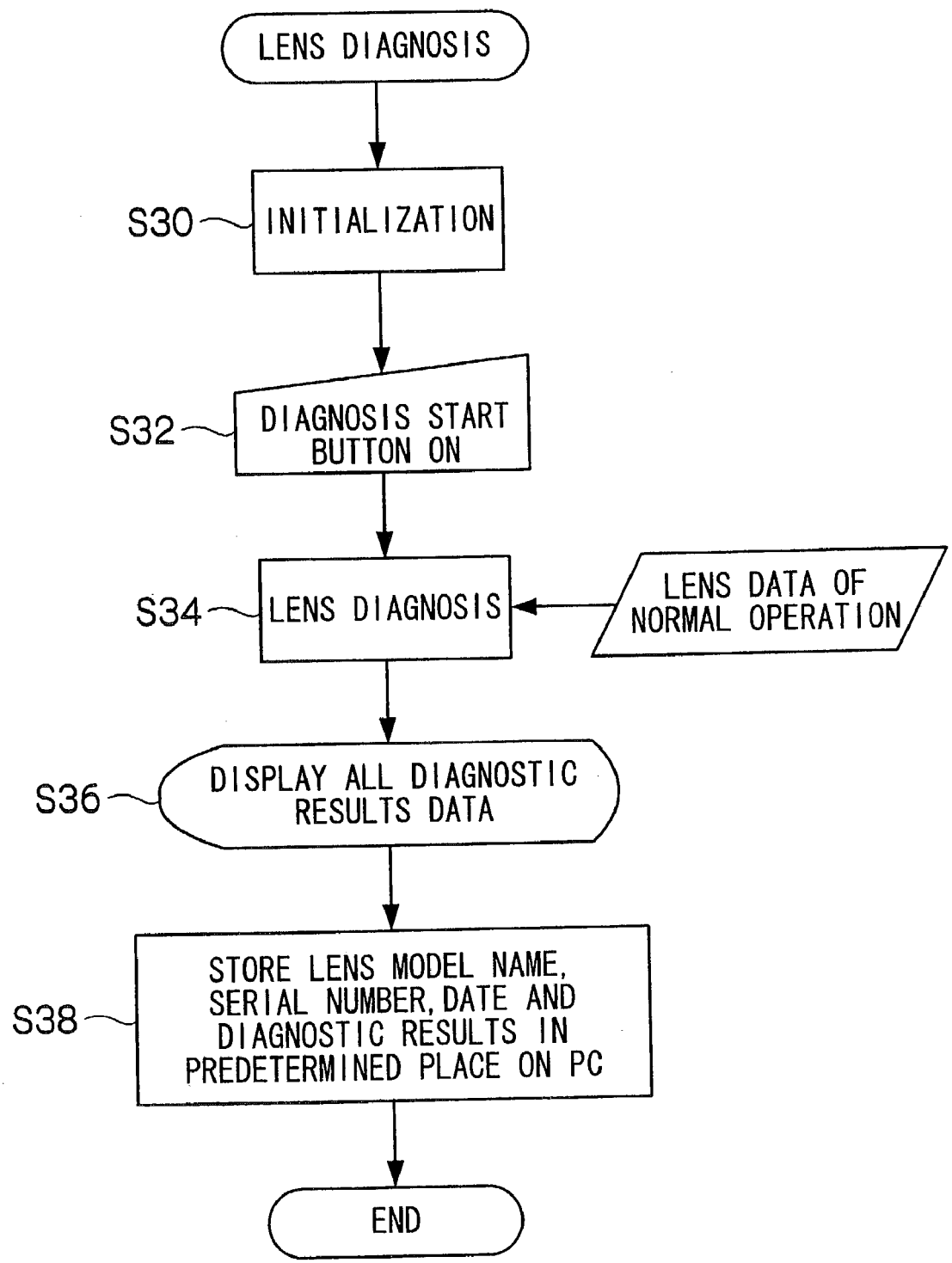
FIG. 10 is a flowchart showing a procedure of the PC for the automatic execution in the diagnostic mode.

FIG. 10 is a flowchart showing an overview of the processing of the automatic execution in the CPU 50 of the PC 16. If, after performing required initialization (step S30), a diagnosis start button is turned on (selection of "AUTO" in the "TOTAL" frame in the "FIND Menu" screen (refer to FIG. 7)) (step S32), the CPU 50 obtains the information necessary for the diagnosis from the lens 10 so as to perform the lens diagnosis (the automatic execution process). In this case, it refers to the lens data of normal operation to determine whether or not it is normal (step S34). And it displays all the diagnostic results data on the monitor, and stores a lens model name, a serial number, a date and the diagnostic results in a predetermined place on the PC 16 (step S38). The storage of the data in the step S38 is automatically performed in order to refer to the data in the diagnostic history display mode mentioned later.

5.2 Processing of the Individual Execution 5.2.1 Individual Execution Items

For instance, it is possible, by selecting the items to be diagnosed in the "INDIVIDUAL" frame on the "FIND Menu" screen in FIG. 7, to individually diagnose the items of the zoom, focus, iris, extender, advanced back focus (only in the case where the lens 10 has the function) and power-supply voltage. The FIND system can automatically recognize the functions accompanying the lens 10 connected to the PC 16 so that only the diagnostic items corresponding to the functions of the lens are displayed in the "INDIVIDUAL" frame so as to be selected.

Figure 11:
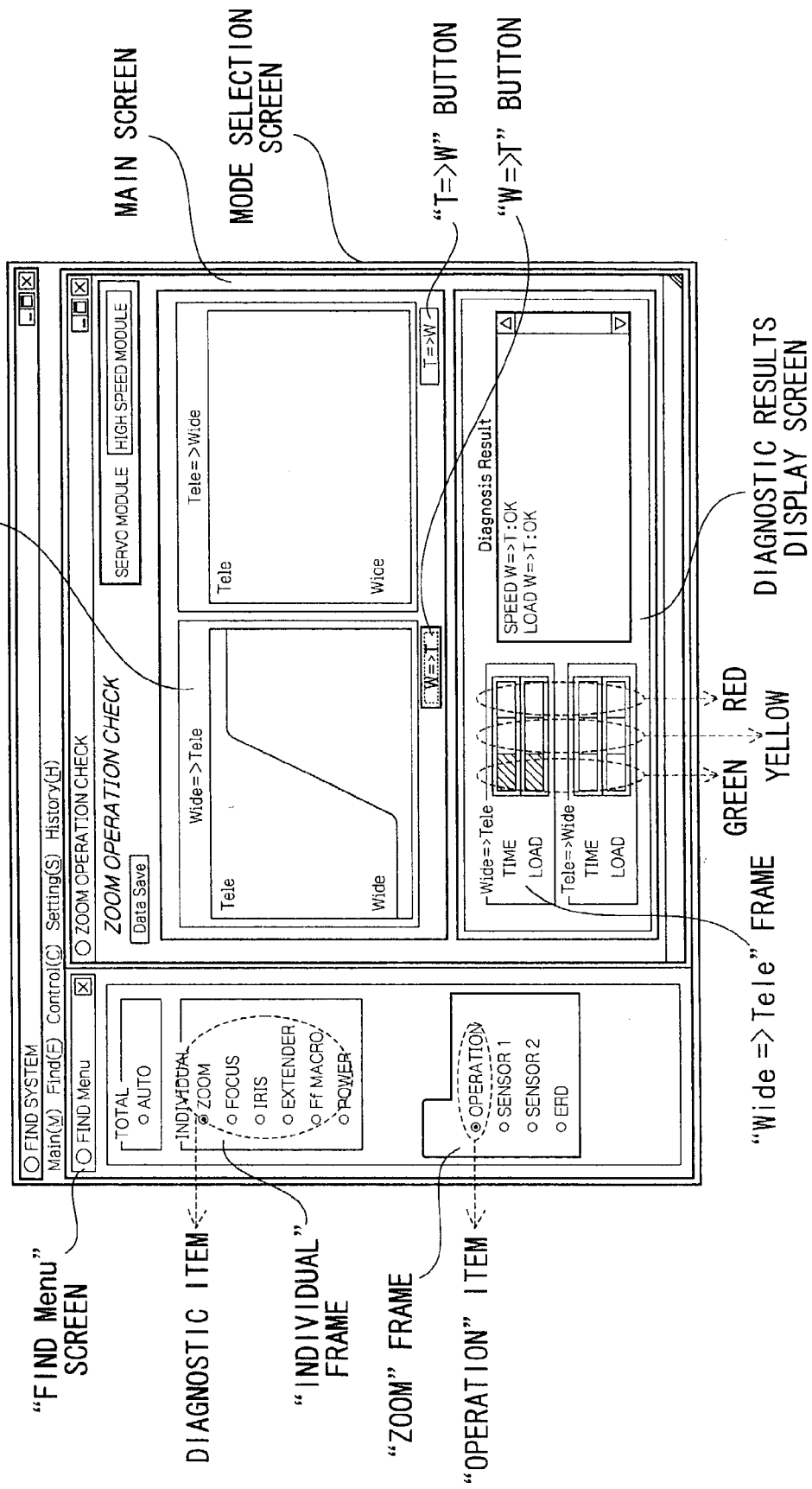
FIG. 11 is a drawing showing the screen displayed in the case of selecting a diagnosis of a zoom in the individual execution in the diagnostic mode and also selecting an OPERATION mode.

If a desired diagnostic item is selected in the "INDIVIDUAL" frame, in the case where, due to the nature of the item, there are a plurality of applicable modes of the modes described below, a new frame for selecting the mode is further displayed in the "FIND Menu" screen. For instance, in the case where the zoom ("ZOOM" item) is selected in the "INDIVIDUAL" frame, a new frame ("ZOOM" frame) for selecting a mode is displayed on the "FIND Menu" screen as shown in FIG. 11. It is possible, by selecting one of the "OPERATION" item, "SENSOR 1" item, "SENSOR 2" item and "E RD" item, to select one of the OPERATION mode, SENSOR (1) mode, SENSOR (2) mode and ERD mode.

5.2.2 OPERATION Mode

The diagnosis of the operation time and load of the lens 10 is performed in the OPERATION mode. To describe it by taking an example of the case of selecting the diagnosis of the zoom, if the "OPERATION" item is selected in the "ZOOM" frame on the "FIND Menu" screen in FIG. 11 as described above, then it enters the OPERATION mode so that the main screen as shown in FIG. 11 is displayed. The configuration of the main screen is the same as that of the main screen in FIG. 8 used in the description of the automatic execution. And the diagnosis is started by clicking either one of a "W=>T" button or a "T=>W" button on the main screen. As the processing of the diagnosis and the display of the diagnostic results are the same as those described as to the case of the automatic execution, a description thereof will be omitted.

5.2.3 SENSOR (1) Mode

Figure 12:
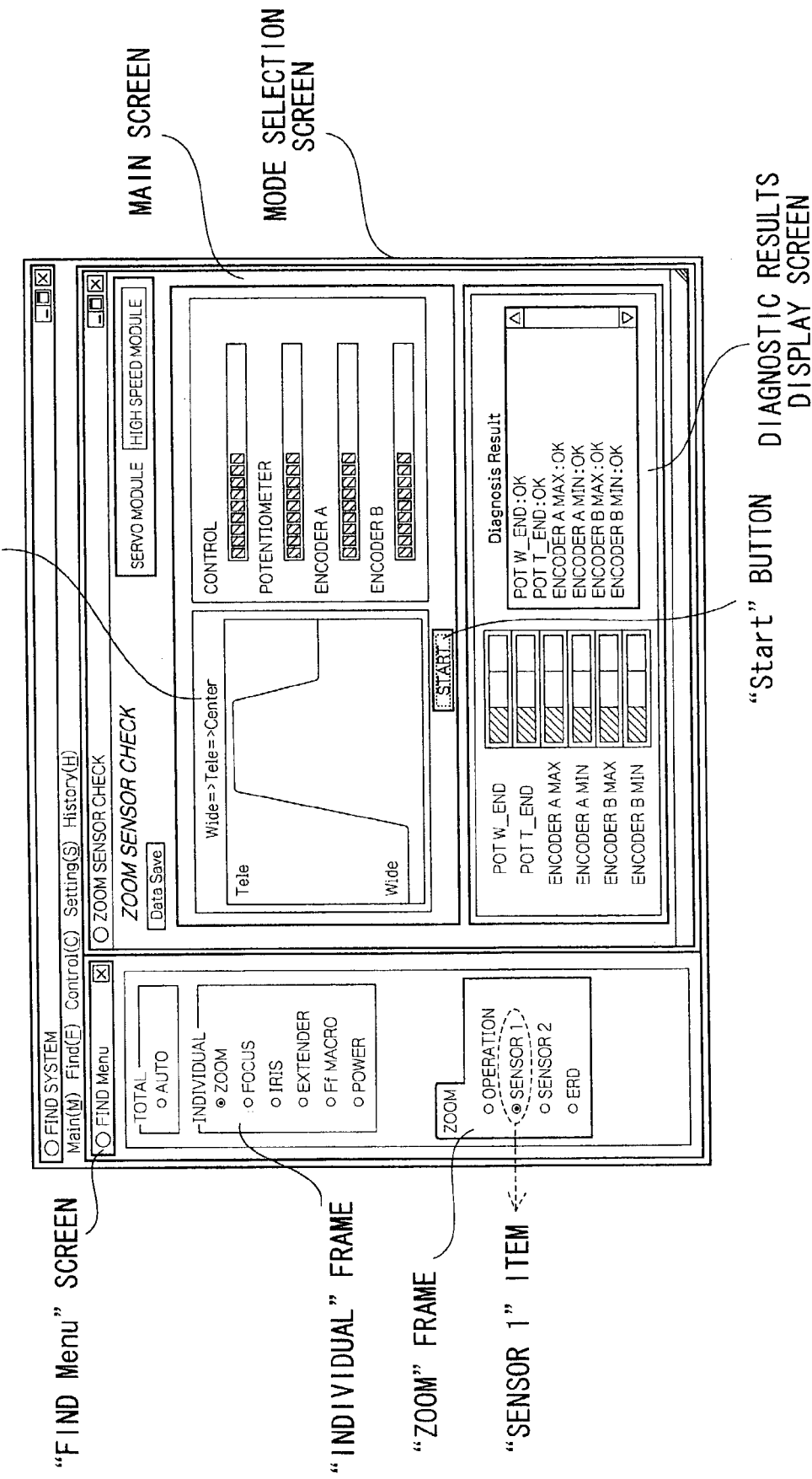
FIG. 12 is a drawing showing the screen displayed in the case of selecting the diagnosis of the zoom in the individual execution in the diagnostic mode and also selecting a SENSOR (1) mode.

In the SENSOR (1) mode, the diagnosis of the position tracking sensors (each position tracking sensor 24 in FIG. 2) is performed. To describe it by taking an example of selecting the case of the diagnosis of the zoom, if the "SENSOR 1" item is selected in the "ZOOM" frame on the "FIND Menu" screen as shown in FIG. 12, it enters the SENSOR (1) mode and the main screen as shown in FIG. 12 is displayed. And the diagnosis is started by clicking the "Start" button on the main screen.

Once the diagnosis is started, the CPU 50 of the PC 16 sends to the CPU 20 of the lens 10 the control signal for ordering the operation of the zoom. That control signal drives the drive member of the zoom so that the zoom is moved from the Wide-end to the Tele-end and thereafter, to the center of the Wide-end and the Tele-end. During that move, the CPU 20 of the lens 10 reads the detected position values one after another from the position tracking sensor related to the drive member of the zoom, and sends the detected position values to the PC 16 in real time.

The CPU 50 of the PC 16 displays the control signal sent to the lens 10 and the detected position values obtained from the lens 10 on the main screen in FIG. 12 in real time. For instance, it graphically represents the value of the control signal and the detected position value in the "Wide=>Tele=>Center" frame on the main screen, and indicates these values to the right thereof by an indicator. Moreover, this drawing shows the case of having the potentiometer and two encoders (A, B) provided as the position tracking sensors related to the zoom.

Once the zoom is moved to the center and the diagnostic operation is finished, the CPU 50 of the PC 16 determines whether or not the maximum value and the minimum value of the detected position values obtained from the lens 10 are normal, indicate the state requiring the adjustment or indicate the state requiring the repair. And it displays the results on the diagnostic results display screen in FIG. 12. The diagnostic results of the maximum value and the minimum value of the detected position values given by the position tracking sensor are displayed by the lighting position and lighting color on the left side of the diagnostic results display screen, where the inside of the leftmost display frame is lighted in green if determined as normal, the inside of the central display frame is lighted in yellow if determined as the state requiring the adjustment, and the rightmost display frame is lighted in red if determined as the state requiring the repair. The diagnostic results are represented in characters on the right side of the diagnostic results display screen.

5.2.4 SENSOR (2) Mode

Figure 13:
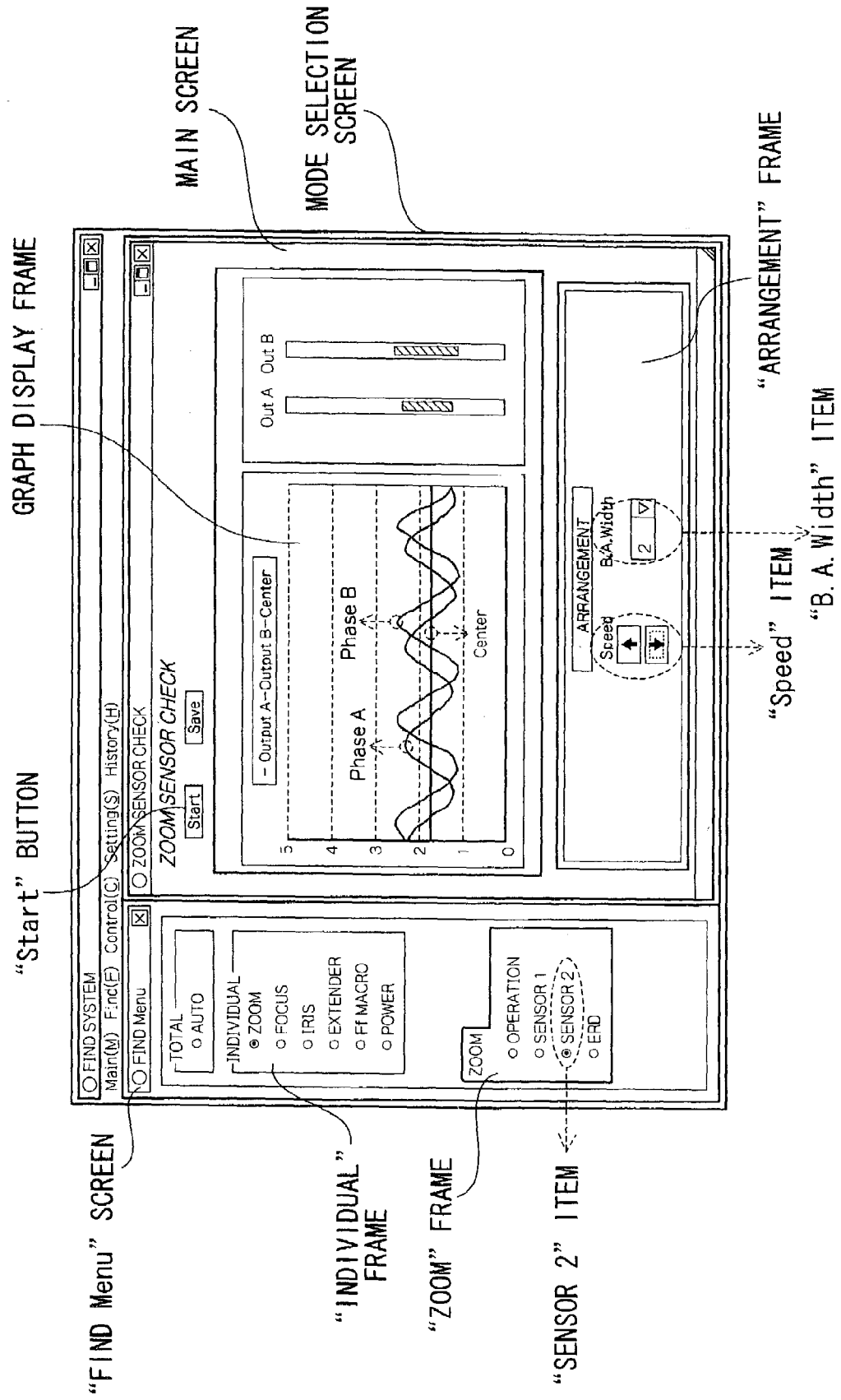
FIG. 13 is a drawing showing the screen displayed in the case of selecting the diagnosis of the zoom in the individual execution in the diagnostic mode and also selecting a SENSOR (2) mode.

In the SENSOR (2) mode, the detailed check of the position tracking sensors (each position tracking sensor 24 in FIG. 2) is performed. To describe it by taking an example of selecting the case of the diagnosis of the zoom, if the "SENSOR 2" is selected in the "ZOOM" frame on the "FIND Menu" screen as shown in FIG. 13, it enters the SENSOR (2) mode and the main screen as shown in FIG. 13 is displayed. And the operation check of the encoders can be performed by clicking the "START" button on the main screen.

The CPU 50 of the PC 16 sends to the lens 10 the control signal for ordering the operation of the zoom, and moves the zoom at a fixed speed and also obtains output values of the encoders at the time from the lens 10 to graphically represent the output values in a graphic representation frame. As for the graphic representation frame in FIG. 13, the operator can determine it to be normal if a line indicating the center is around the center of an SIN wave representing an output signal of a phase A and the SIN wave representing the output signal of a phase B. A fine adjustment can be made to an operational speed of the zoom by clicking a "↑" button (to accelerate) or a "↓" button (to decelerate) of the "SPEED" item. It is also possible, by changing the value of a "B.A.WIDTH" item, to change a horizontal axis of the graph.

5.2.5 ERD Mode (Controller Diagnosis)

It is also possible, in the FIND system, to diagnose the controller connected to the lens 10 such as the zoom controller 14 or focus controller 12. In the controller diagnosis, the PC 16 reads the information set up or stored by the controller (controller information) such as the setup state of the operating portion and the switches provided to the controller and shot (preset) data stored by the controller, and the diagnosis of whether or not the controller is normal is performed based on such information.

In the controller diagnosis, it is possible, by changing an environmental setup of software, to select the two modes of the interactive-mode and non-interactive-mode. If the interactive-mode is selected, guidance for prompting the operator to perform a predetermined operation such as "Operate . . . " is displayed, and the PC 16 determines whether or not the signal corresponding to the operation is sent so that the diagnostic results of whether or not the controller is normal are displayed on the monitor 56. If the non-interactive-mode is selected, the controller information is displayed on the monitor 56 in real time, and the operator arbitrarily controls the controller and checks the display of that operation having been performed on the monitor 56 so as to diagnose whether or not the controller is normal based on the operator's determination. In this case, the diagnostic results are not displayed on the monitor 56.

Figure 14:
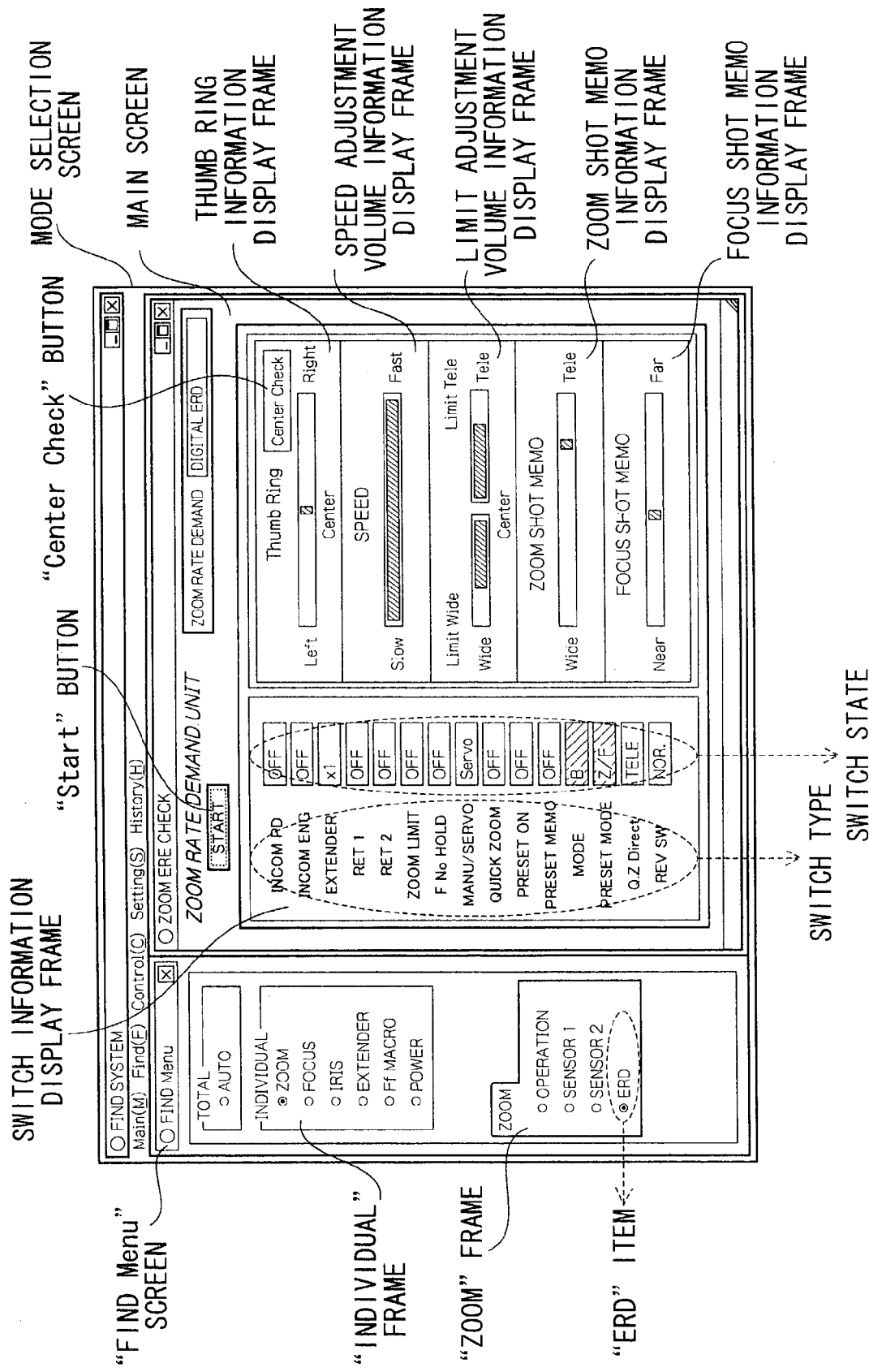
FIG. 14 is a drawing showing the screen displayed in the case of selecting the diagnosis of the zoom in the individual execution in the diagnostic mode and also selecting an ERD mode.

To describe it by taking as an example of the case of performing the diagnosis of the zoom controller 14, in the case where the "ZOOM" item is selected in the "INDIVIDUAL" frame on the "FIND Menu" screen and the "ERD" item is selected in the "ZOOM" frame as shown in FIG. 14, it enters the ERD mode and the main screen as in FIG. 14 is displayed. If the "START" button is clicked on the main screen, the controller diagnosis of the zoom controller 14 is started.

On the main screen, there are the frames for displaying each of the controller information set up or stored by the zoom controller 14 such as a switch information display frame, a thumb ring information display frame, a speed adjustment volume information display frame, a limit adjustment volume information display frame, a zoom shot memo information display frame, and a focus shot memo information display frame. And based on the controller information read to the PC 16, the setup state of each switch 44 of the zoom controller 14 and the operating portion 42 (the thumb ring 14A, speed adjustment volume and limit adjustment volume) and shot data stored by the zoom controller 14 are displayed in the corresponding frames respectively. In the case of the non-interactive-mode, the controller information is read from the lens 10 in real time, which controller information is displayed in each frame in real time.

Figure 15:
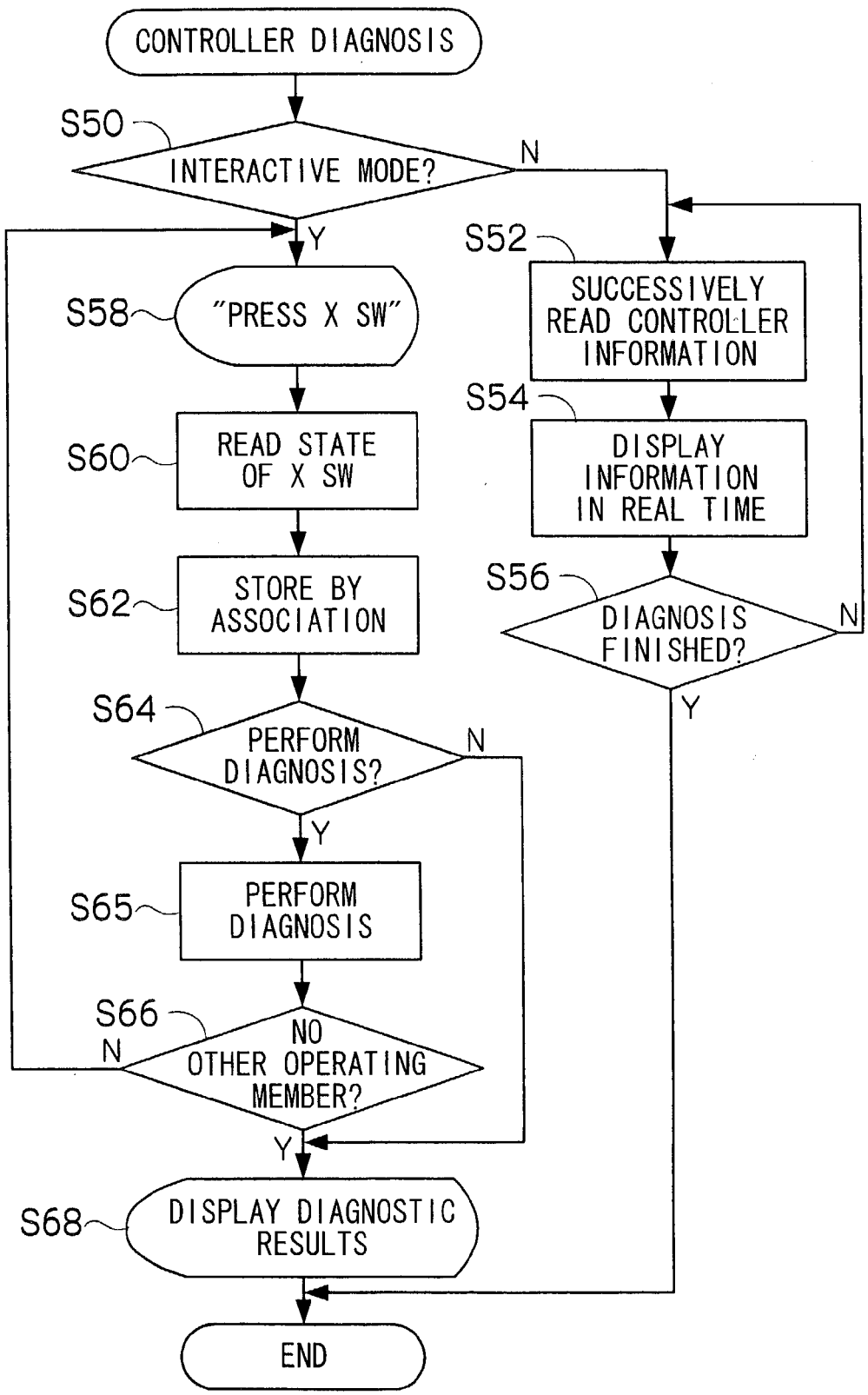
FIG. 15 is a flowchart showing the procedure of a controller diagnosis.

An overview of the processing of the controller diagnosis will be described by the flowchart in FIG. 15. The CPU 50 of the PC 16 determines whether or not it is in the interactive-mode (step S50). In the case where it is determined as NO, that is, the non-interactive-mode, then the CPU 50 successively reads the controller information (the state of the operating portion and each switch) from the lens 10 (step S52). The lens 10 obtains the controller information from the controller to be diagnosed. And it displays the information on the monitor 56 in real time (step S54). Subsequently, it determines whether or not the end of the diagnosis was ordered (step S56), and finishes the diagnosis in the case where it is determined as YES. In the case where it is determined as NO, it returns to the step S52. In the controller diagnosis in the non-interactive-mode according to this embodiment, each of the controller information is displayed in the corresponding frame on FIG. 14, and the operator checks the displayed controller information so as to determine whether or not there is the abnormality to the controller.

In the case where it is determined as YES at the step S50, that is, the interactive-mode, the CPU 50 first displays the guidance indicating "Press X SW" on the monitor 56 (step S58). The display portion of "X SW" indicates a predetermined operating member provided to the controller to be diagnosed (not limited to the switch). In addition, "Press" is changed as appropriate to a sentence indicating an action corresponding to the type of "X SW."

And it reads via the lens 10 the state of "X SW" for which operation was ordered (step S60), and stores the type of the operating member to be diagnosed and the state of the operating member (including whether or not there is a signal from the operating member) by associating them (step S62). Next, it determines whether or not to perform the diagnosis (step S64). In the case where it is determined as YES, it performs the diagnosis of the operating member from the state thereof stored in the step S62 (step S65).

Subsequently, it determines whether or not there is any other operating member yet to be diagnosed (step S66). In the case where it is determined as NO, it returns to the step S58 to displays the guidance for prompting the operation of the other operating member, and performs the above processing. In the case where it is determined as NO in the step S64, it displays the diagnostic results of the diagnosis performed in the step S65 (step S68) so as to finish the diagnosis.

5.2.6 Offset Diagnosis

If a "Center Check" button in the thumb ring information display frame on the main screen in FIG. 14 is pressed, the offset diagnosis of the zoom controller 14 is performed. While the offset diagnosis can be performed likewise as to the focus controller 12, the offset diagnosis of the zoom controller 14 will be described here. In the offset diagnosis, the information on the thumb ring 14A of the zoom controller 14 (the control signal sent to the lens 10 from the zoom controller 14 correspondingly to the setup position of the thumb ring 14A) is read to the PC 16, and it is determined whether or not the control signal is in a fixed range in the sate in which the thumb ring 14A is set in the reference position (in the sate of no operation).

The processing of the offset diagnosis will be described by using the flowcharts in FIGS. 16 and 17. In the flowchart in FIG. 16, the CPU 50 of the PC 16 displays an alert on the monitor 56 to put the thumb ring 14A at the center (no operation state of the thumb ring) (step S80). And a few seconds later, it displays a start of the diagnosis (step S82). Next, for a few seconds, it obtains from the CPU 20 of the lens 10 the control signal from the zoom controller 14 and the detected position value (follow signal) detected by the position tracking sensor (position tracking sensor for detecting positions of the zoom lens) related to the drive member of the zoom so as to store the maximum value, minimum value and tendency of increase and decrease thereof (step S84).

Figure 18:
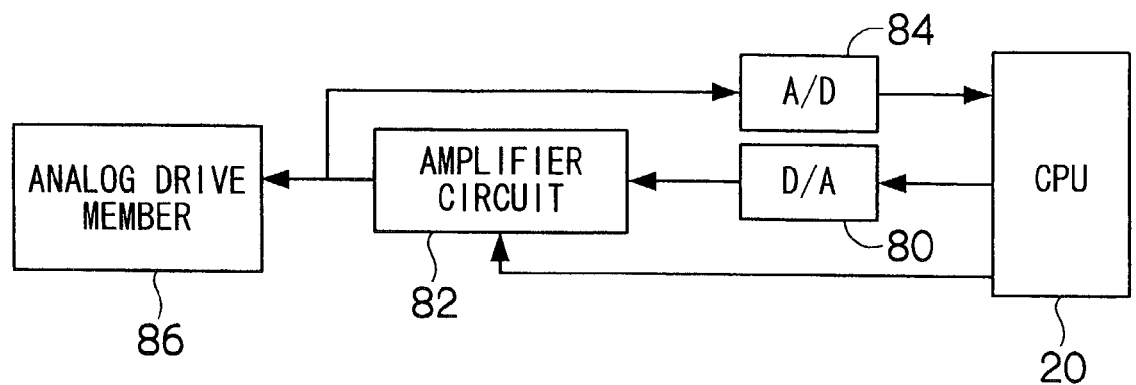
FIG. 18 is a drawing showing a configuration between a CPU and a drive member of the lens in the case of an analog drive member.

There are digital and analog drive members, and in the case where the drive member of the zoom is digital, a digital control signal is sent as-is from the CPU 20 of the lens 10 to the drive member of the zoom. As opposed to this, in the case where the drive member of the zoom is analog, the CPU 20 of the lens 10 is connected to the analog drive member via a D/A converter 80 and an amplifier circuit 82 as shown in FIG. 18, and the control signal outputted from the CPU 20 of the lens 10 is converted into an analog signal by the D/A converter 80 and then amplified by the amplifier circuit 82 so that the output signal from the amplifier circuit 82 is provided to an analog drive member 86. Thus, in the case where the lens 10 has the analog drive member 86 mounted thereon, the output signal from the amplifier circuit 82 is also detected by the CPU 20 of the lens 10 via an A/D converter 84, other than the control signal and follow signal, so that the output signal is sent to the CPU 50 of the PC 16.

Next, it reads diagnostic data from the lens data of normal operation held as the database by the PC 16 (step S86), and determines whether or not the control signal obtained from the lens 10 is within the range of the standard values (step S88). In the case where it is determined as NO, it determines it as the abnormality of the controller (step S90), and displays the details of the diagnostic results and error (step S100). The standard values means the values within the range of the values of the control signals allowed as the values to stop the zoom in the state where the thumb ring 14A is at the center, that is, the range of the values which the control signals should originally take in the state where the thumb ring 14A is at the center (hereafter, the same applies to the standard values of the follow signal and so on).

In the case where it is determined as YES in the step S88, it determines whether or not the drive member of the zoom is analog (step S92). In the case where it is determined as NO, it determines next whether or not the follow signal obtained from the lens 10 is within the range of the standard values (step S96). In the case where it is determined as NO in the step S96, it determines the drive member (module) of the zoom to be abnormal (step S98), and in the case where it is determined as YES, it determines it to be normal and displays the details of the diagnostic results and error (step S100).

In the case where it is determined as YES, that is, the drive member of the zoom is analog in the step S92, it determines next whether or not the output signal is within the range of the standard values (step S94). In the case where it is determined as YES, it performs the processing from the step S96 onward as in the case of determining it to be digital.

Figure 16:
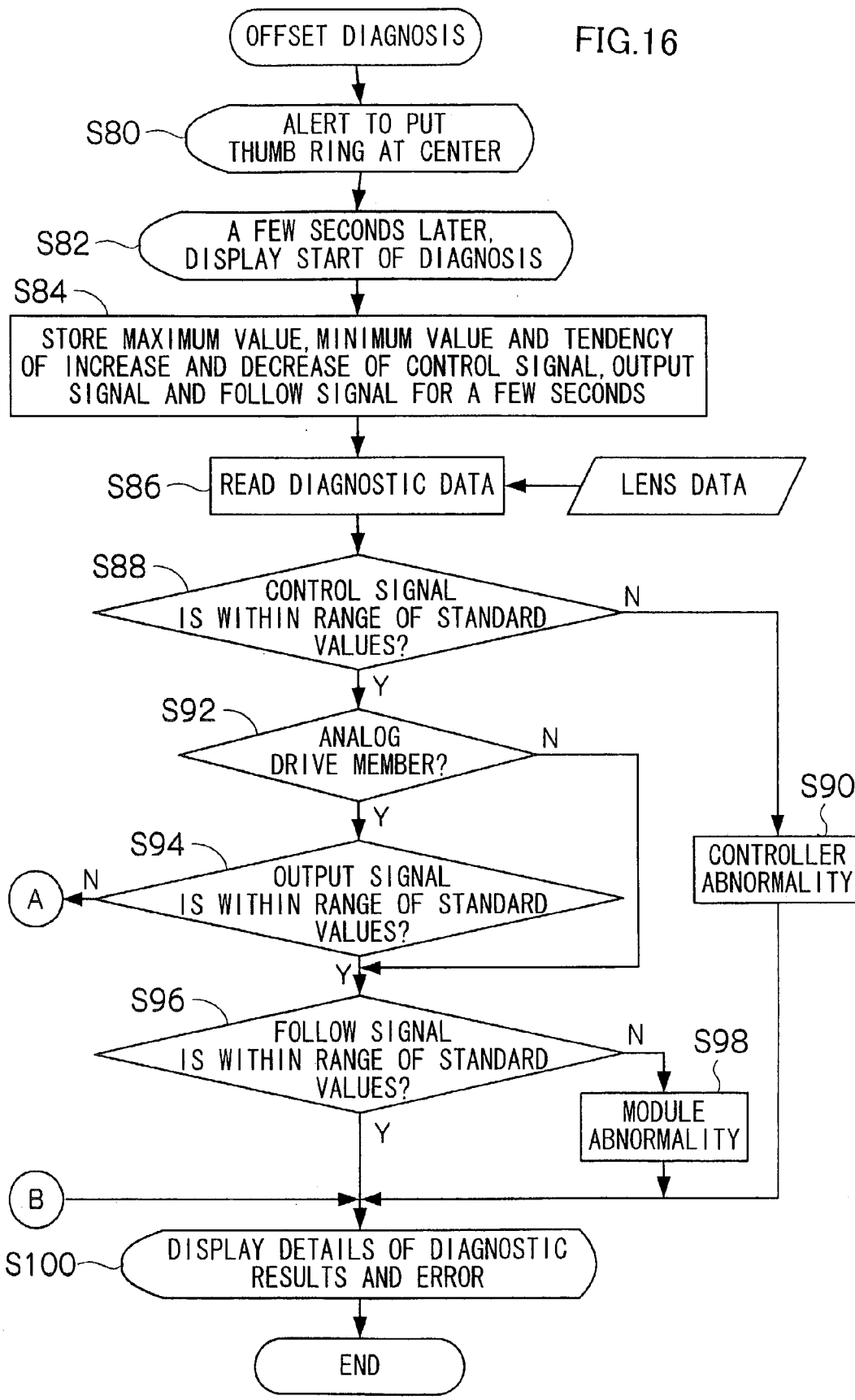
FIG. 16 is a flowchart showing the procedure of an offset diagnosis.
Figure 17:
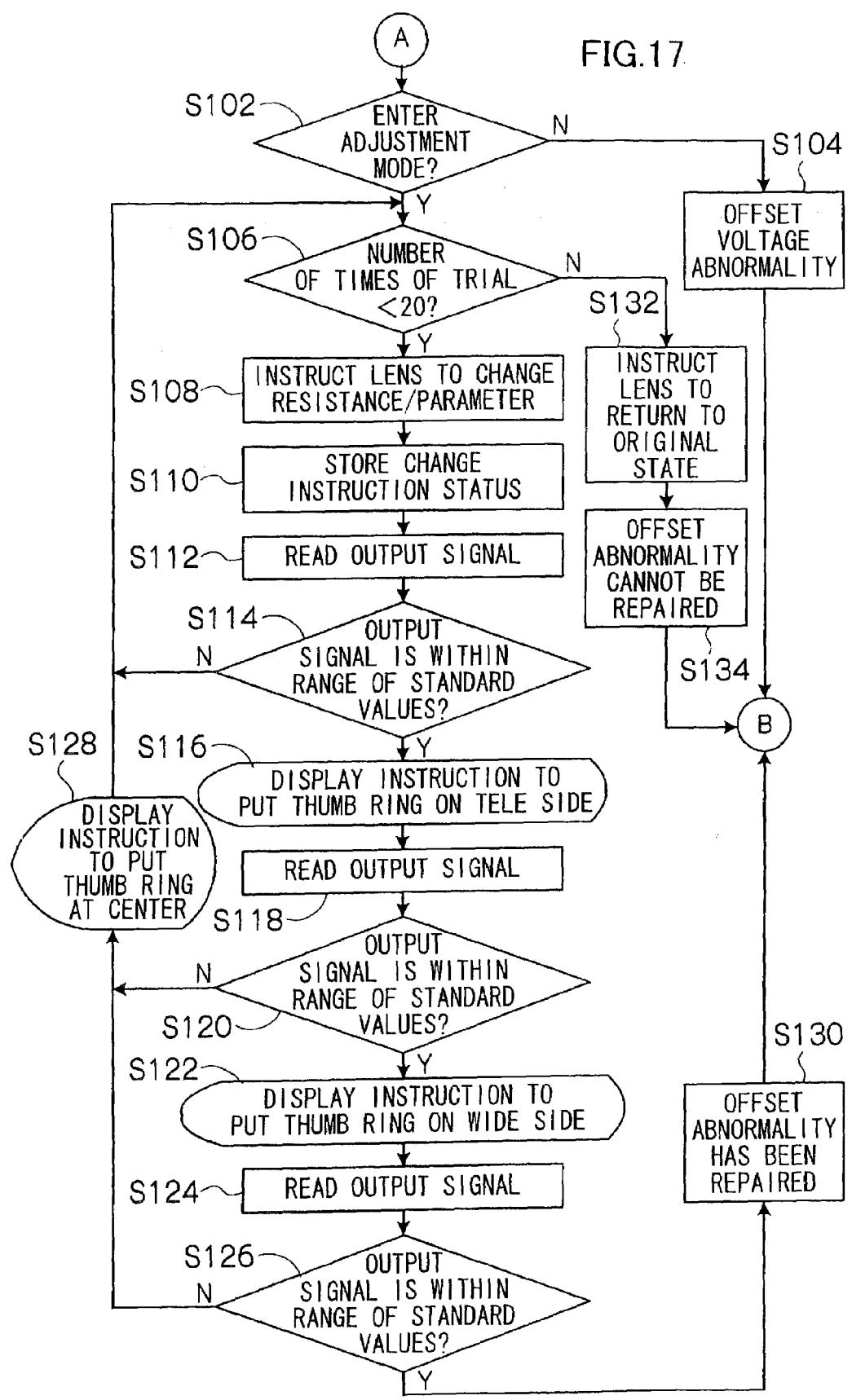
FIG. 17 is a flowchart showing the procedure of the offset diagnosis.

In the case where it is determined as NO in the step S94, it determines next whether or not to enter an adjustment mode as shown in FIG. 17 (step S102). The instruction as to whether or not to enter the adjustment mode is provided by the operator. In the case where it is determined as NO, it determines it to be an offset voltage abnormality (step S104), and returns to FIG. 16 to display the details of the diagnostic results and error (step S100).

In the case where it is determined as YES in the step S102, it determines next whether or not the number of times of trial is less than 20 (step S106).

In the case where it is determined as YES, it provides to the lens 10 an instruction to change the resistance/parameter for determining the output voltage of the amplifier circuit 82 (refer to FIG. 18) (step S108), and stores a change instruction status thereof (step S110). Moreover, it is possible, by changing the resistance/parameter for determining the output voltage of the amplifier circuit 82 (refer to FIG. 18), to change a voltage shift amount for an input voltage to be inputted to the amplifier circuit 82 and the size of the gain for that input voltage.

Subsequently, it reads the output signal of the amplifier circuit 82 from the lens 10 (step S112), and determines whether or not the output signal is within the range of the standard values (step S114). In the case where it is determined as NO, it repeats the processing from the step S106 onward.

In the case where it is determined as YES in the step S114, it displays an instruction to put the thumb ring 14A on the Tele-side (Tele-end) (step S116). And it reads the output signal of the amplifier circuit 82 from the lens 10 (step S118), and determines whether or not the output signal is within the range of the standard values (step S120). In the case where it is determined as NO, it displays an instruction to put the thumb ring 14A at the center (step S128) and repeats the processing from the step S106 onward.

In the case where it is determined as YES in the step S120, it displays an instruction to put the thumb ring 14A on the Wide-side (Wide-end) (step S122). And it reads the output signal of the amplifier circuit 82, and determines whether or not the output signal is within the range of the standard values (step S124). In the case where it is determined as NO, it displays an instruction to put the thumb ring 14A at the center (step S128) and returns to the step S106.

In the case where it is determined as YES in the step S126, that is, in the case where all of the follow signal and the output signals of the Tele-end and Wide-end are within the range of the standard values, it determines that the offset abnormality has been repaired (step S130), and returns to FIG. 16 to display the details of the diagnostic results and error (step S100).

In the case where it is determined as NO in the step S106, it instructs the lens 10 to return the amplifier circuit 82 to the original state (step S132), determines that the offset abnormality cannot be repaired (step S134), and returns to FIG. 16 to display the details of the diagnostic results and error (step S100).

6. PC Control Mode

Figure 19:
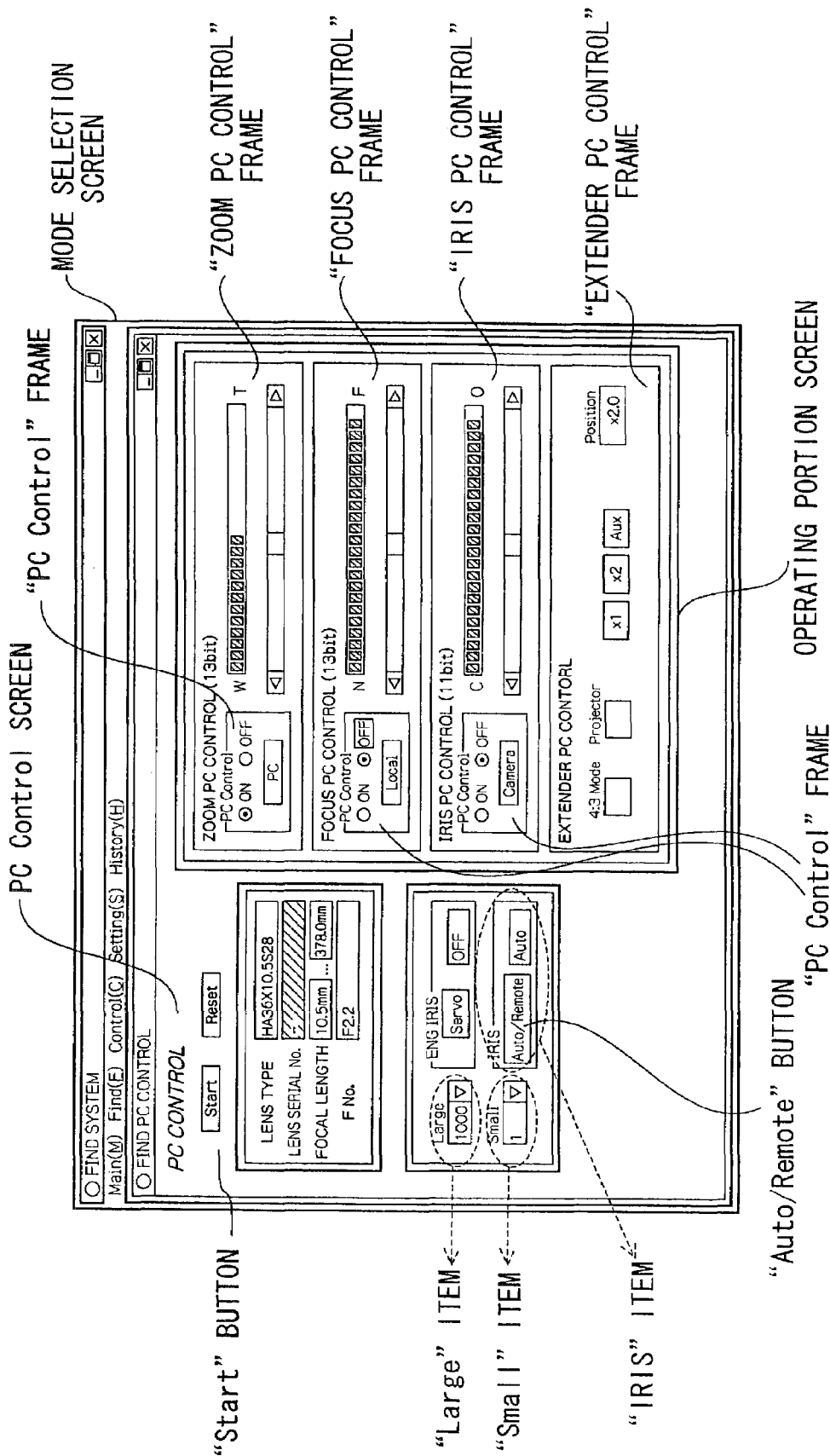
FIG. 19 is a drawing showing the screen displayed in the case of selecting a PC control mode.

For instance, if "Control (C)" on the menu bar is clicked on the mode selection screen as shown in FIG. 5 and "Control Start" in the menu is selected, the PC control mode for. controlling the lens 10 with the PC 16 can be selected. If the PC control mode is selected, the PC control screen as shown in FIG. 19 is displayed. If the "Start" button on the PC control screen is clicked, the communication with the lens 10 is started so that the PC control becomes possible.

The operating portion screen of the PC control screen displays a "ZOOM PC CONTROL" frame for zoom operation, a "FOCUS PC CONTROL" frame for focus operation, an "IRIS PC CONTROL" frame for iris operation and an "EXTENDER PC CONTROL" frame for extender operation, and a "PC Control" frame is displayed in the "ZOOM PC CONTROL" frame, "FOCUS PC CONTROL" frame and "IRIS PC CONTROL" frame. If "ON" in the "PC Control" frame is clicked and the display in each frame is changed from "Local" or "Camera" to "PC," the control by the PC becomes possible. In the state where the control by the PC 16 is possible, if a bar of a scroll bar in each of the "ZOOM PC CONTROL" frame, "FOCUS PC CONTROL" frame and "IRIS PC CONTROL" frame is moved, the control signal corresponding to that position is sent to the lens 10, and each drive member of the ZOOM, FOCUS and "IRIS is driven. Moreover, a progress bar on the scroll bar indicates the position of the function.

As for the extender operation, there is no special switching operation and the control by the PC 16 is possible. A button for switching a magnification and so on are displayed in the "EXTENDER PC CONTROL" frame.

A "Large" item and a "Small" item in the setup screen on the left side of the PC control screen are to determine a controlled moving amount, where, on the scroll bar in each operating portion frame except the EXTENDER, the moving amount on clicking the inside of the scroll bar once is changed as to "Large" and the moving amount on clicking both ends of the scroll bar once is changed as to "Small." If an Auto/Remote button of the "IRIS" item in the setup screen is clicked, the control of the IRIS is switched between auto and remote.

Here, in the case where the PC control mode is selected as described above, it is not necessary, unlike the case of the diagnostic mode, to detect the current and voltage of the power supply in the lens 10 with the current/voltage detecting circuit 26 (refer to FIG. 2). Thus, if one of the diagnostic mode and PC control mode is selected, the CPU 50 of the PC 16 notifies the CPU 20 of the lens 10 of the selected mode. In the case where the diagnostic mode is selected, the CPU 20 of the lens 10 performs the process of reading the values of the current and voltage from the current/voltage detecting circuit 26. In the case where the PC control mode is selected, it does not perform the process so as to alleviate the load of the process.

7. Diagnostic History Display Mode

Figure 20:
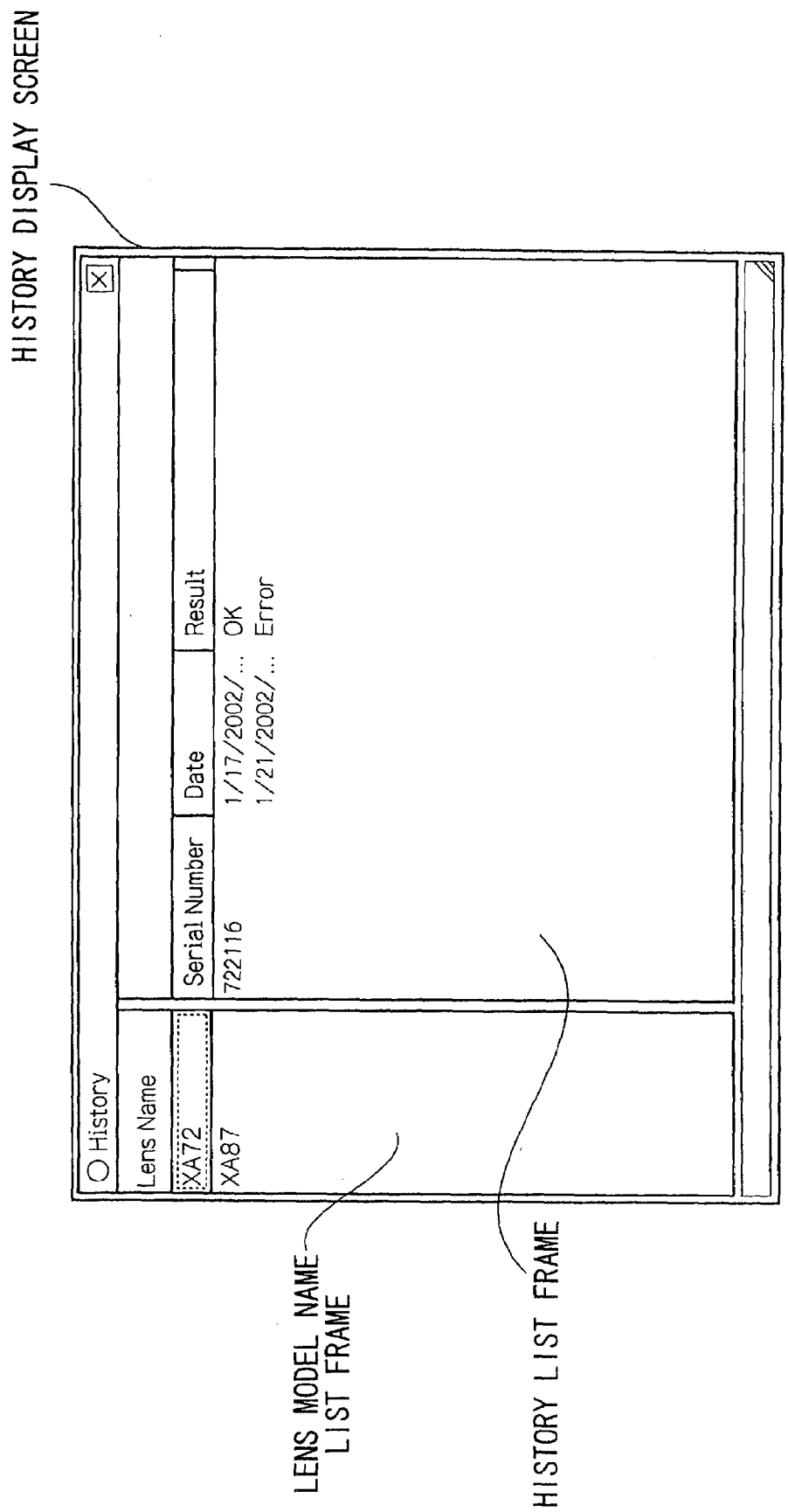
FIG. 20 is a drawing showing the screen displayed in the case of selecting a diagnostic results display mode.

If "History (H) on the menu bar is clicked on the mode selection screen as shown in FIG. 5 and "History List (L)" in the menu is selected, the diagnostic history display mode for displaying the past diagnostic history can be selected. If the diagnostic history display mode is selected, the diagnostic history display screen as shown in FIG. 20 is displayed. The lens model names diagnosed in the past are list-displayed on the left side of the screen (lens model name list frame), and if the lens model name is selected therefrom, the diagnostic history of the lens is list-displayed on the right side of the screen. The right-side screen (history list frame) displays the serial number, date of the diagnosis and diagnostic results.

Figure 22:
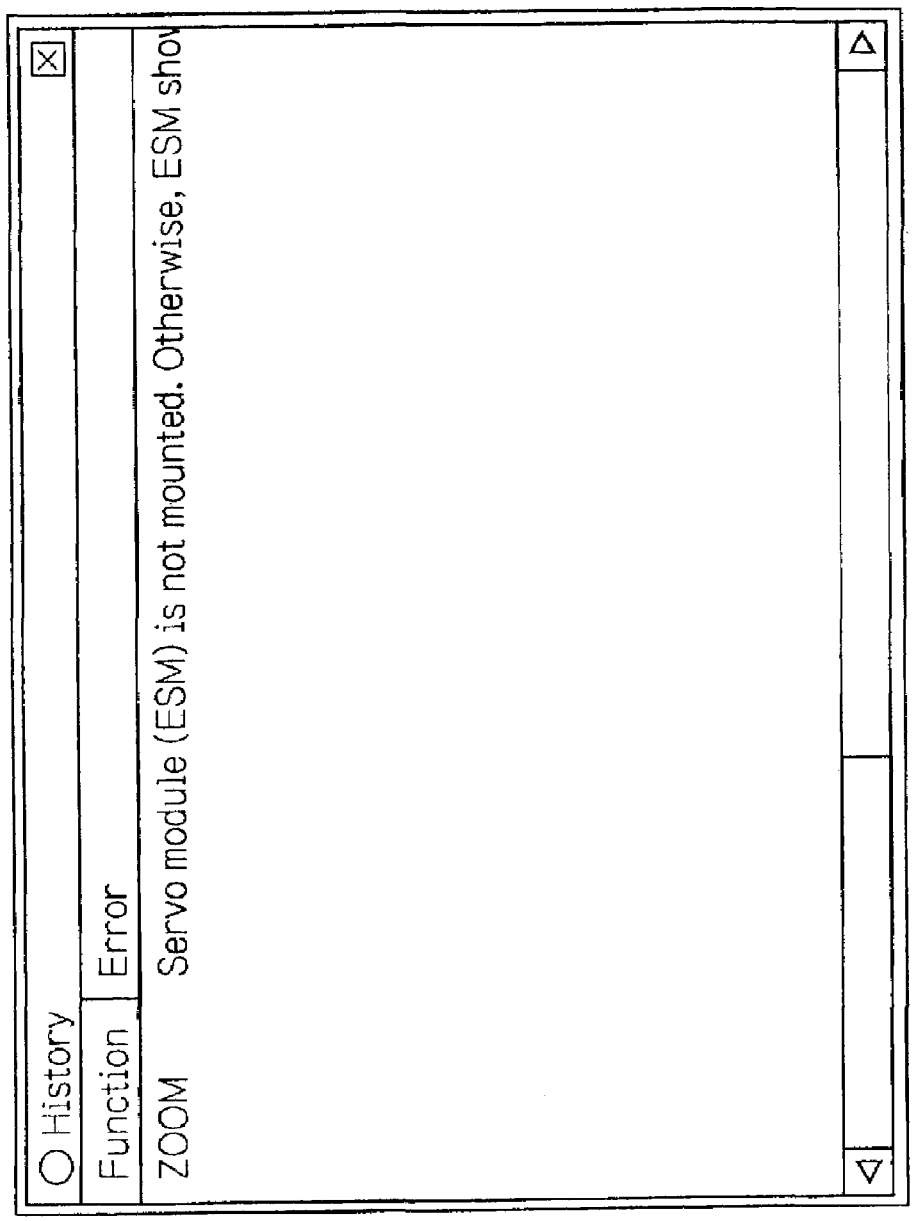
FIG. 22 is a drawing showing the diagnostic results detail display screen displayed in the case of selecting a "Results Details (R)" menu displayed on the screen in FIG. 21.

If desired data in the history list frame is right-clicked, a popup menu as shown in FIG. 21 is displayed. Here, if a "Results Details (R) menu" is selected, a detail display screen of the diagnostic results as shown in FIG. 22 is displayed. The detail display screen displays the function to which an error has occurred and brief contents of the error. If a "Delete (D)" menu is selected in the popup menu, the history is erased.

The data of the diagnostic history (hereafter, diagnostic history data) displayed as described above is automatically stored in the memory 52 of the PC 16 each time the automatic execution is performed in the diagnostic mode (see the step S38 in FIG. 10). The diagnostic history data is comprised of the data of the lens model name, serial number, date (year, month, day of the month, hour, minute, second), diagnostic results and diagnostic results details of the diagnosed lens 10, where each of the data is associated in a hierarchical structure as shown in FIG. 23 and is stored in the memory 52 (a hard disk for instance) of the PC 16 as the data of one diagnostic history file. If the diagnostic mode is automatically executed, the diagnostic history data is stored in the diagnostic history file after storing the past diagnostic history data. It is also feasible to store the diagnostic history data in a registry in which user information and the information necessary for the operation of the OS itself and programs are stored instead of the file unique to the system.

If the diagnostic history display mode is selected as described above, the diagnostic history file is read by the CPU 50 of the PC 16 so that the diagnostic history display screen shown in FIG. 20 and so on are displayed on the monitor 56.

It is also feasible to have the diagnostic history data as mentioned above automatically stored in the memory 52 not only in the case of the automatic execution in the diagnostic mode but also in the case of performing the diagnosis by the individual execution. In addition, the lens model name and serial number of the diagnostic history data are the identification of the lens, and it is also possible to have the identification of other contents instead of the lens model name and serial number stored as the diagnostic history data. Furthermore, the diagnostic history data does not necessarily have to include the identification of the lens, but it may be only the diagnostic results and date information.

Furthermore, although the diagnostic history data (diagnostic history file) was recorded and stored in the memory 52 of the PC 16, it is also possible to record and store it in the memory 28 in the diagnosed lens 10.

As described above, the diagnosis of the lens apparatus is performed by an external computer for performing the two-way communication according to the present invention, it is not necessary to provide a dedicated substrate for self-diagnosis on the lens apparatus side, but it is sufficient to provide thereon a communication function capable of digital two-way communication with the computer and the function of operating according to the control signal inputted from the computer and sending back to the computer the information necessary for the diagnosis of the driving member on the operation. In addition, the above-described computer can be constituted by installing the above-described diagnostic program on a general-purpose computer or the like.

Moreover, the operating member is set up at the setup position determined to have the movable optical element such as a zoom lens set up in a predetermined state so that, by determining whether or not the control signal, follow signal and so on outputted at the time are appropriate values, it is determined whether or not an offset abnormality is arising and if it is arising, which portion is abnormal. Therefore, it is possible to obtain such information easily by the diagnosis so as to alleviate the effort at the repair and adjustment.

In addition, if the diagnosis of the lens apparatus is performed, the diagnostic results are automatically recorded and stored as the diagnostic history data on the record medium, and so it is possible to eliminate the trouble for the operator to create the diagnostic history data, specify the file name and storage place and store it. As it is possible to list-display the recorded and stored diagnostic history data of the past, any operator can easily check the past diagnostic history.

Moreover, it is possible to diagnose whether or not there is an abnormality in the controller with the computer through the lens apparatus so as to prevent unanticipated situation due to a failure of the controller and so on. In the case where it is necessary to operate the operating member of the controller on diagnosing the controller, it is possible, by prompting the operator to operate it in the interactive mode, to have the computer determine the diagnostic results such as whether or not there is the abnormality. Even in the case of adopting no interactive mode, it is possible, by displaying the state of the controller on the display device, for the operator to operate an arbitrary operating member and check change in the state of the controller displayed on the display device so as to check whether or not there is the abnormality and so on.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens apparatus diagnostic system, comprising:
a lens apparatus including:
   a detection device which detects information necessary for a diagnosis from each drive member of the lens apparatus;
   a first communication device which performs digital two-way communication; and
   a first control device which operates the drive members according to a control signal inputted via the first communication device and outputs the information detected by the detection device via the first communication device; and
a computer externally connected to the lens apparatus including:
   a second communication device which performs communication with the first communication device of the lens apparatus;
   a display device;
   a storage device which stores a diagnostic program; and
   a second control device which has the diagnostic program executed to operate each of the drive members of the lens apparatus and performs the diagnosis by gathering the information detected by the detection device so as to have diagnostic results thereof displayed on the display device;
   a selection device which selects one of a diagnostic mode to diagnose the lens apparatus and a control mode to externally control the lens apparatus;
   an operating portion which operates each of the drive members of the lens apparatus while in the control mode;
   a device which outputs the control signal according to operation of the operating portion to the lens apparatus via the second communication device; and
   another device which outputs mode information indicating which of the diagnostic mode and the control mode is selected by the selection device to the lens apparatus via the second communication device, and
wherein the lens apparatus detects information necessary for the diagnostic from each of the drive members upon determining the drive members are in the diagnostic mode according to the mode information inputted via the first communication device, and detects from each of the drive members only the information necessary to control the drive members upon on determining the drive members are in the control mode.

2. The lens apparatus diagnostic system, as defined in claim 1,
wherein the storage device of the computer is adapted to automatically record diagnostic results obtained by the diagnosis of the lens apparatus as diagnostic history data at least with date information on a record medium, and to record and store the diagnostic history data of the diagnoses performed in past;
wherein the computer further comprises;
   a diagnostic history display instruction device adapted to provide an instruction to display diagnostic history; and
   a diagnostic history list display device which, upon being instructed to display the diagnostic history by the diagnostic history display instruction device, is adapted to read the diagnostic history data of the past recorded and stored on the record medium by the data storage device from the record medium and to list-display the read diagnostic history data.

3. The lens apparatus diagnostic system as defined in claim 2, wherein the diagnostic history data includes identification of the diagnosed lens apparatus in addition to the diagnostic results and date information.

4. The lens apparatus diagnostic system as defined in claim 2, wherein the diagnostic results recorded and stored as the diagnostic history data by the data storage device include simple information and detailed information, the diagnostic results list-displayed as the diagnostic history data by the diagnostic history list display device being the simple information, so that the detailed information is displayed only when display of the detailed information is specified.

5. The lens apparatus diagnostic system as defined in claim 2, wherein the data storage device records and stores all the diagnostic history data of the diagnoses performed in the past as data in one file.

6. The lens apparatus diagnostic system as defined in claim 2, wherein the diagnostic history list display device list-displays the diagnostic history data for each type of the lens apparatus based on identification of the lens apparatus.

7. The lens apparatus diagnostic system as defined in claim 2, wherein the computer is adapted to diagnose the lens apparatus by having a diagnostic program execute and to operate each of the drive members of the lens apparatus and to gather the information necessary for the diagnosis from the lens apparatus.

8. A lens apparatus diagnostic program applied to a computer, comprising:
   a second communication device which performs communication with a first communication device provided on a lens apparatus,
   a display device, and
   a storage device which stores a diagnostic program;
   a selection device which selects one of a diagnostic mode to diagnose the lens apparatus and a control mode to externally control the lens apparatus;
   an operating portion which operates drive members of the lens apparatus while in the control mode;
   a device which outputs the control signal according to operation of the operating portion to the lens apparatus via the second communication device; and
   another device which outputs mode information indicating which of the diagnostic mode and the control mode is selected by the selection device to the lens apparatus via the second communication device,
   wherein the lens apparatus detects information necessary for diagnosis from the drive members upon determining the drive members are in the diagnostic mode according to the mode information inputted via the first communication device,
   wherein the lens apparatus detects from each of the drive members only the information necessary to control the drive members upon on determining the drive members are in the control mode, and
   wherein upon diagnosing the lens apparatus, the computer is adapted to output a control signal via the second communication device which operates the drive members of the lens apparatus to be diagnosed, to gather via the second communication device information necessary for a diagnosis detected on the lens apparatus side from the drive member member which was operated based on the control signal, to diagnose the drive members based on the gathered information, and to display diagnostic results of the diagnosis on the display device.

9. A record medium, wherein the diagnostic program as defined in claim 8 and at least one of an instruction manual and a product brochure of the lens apparatus are recorded.

10. A lens diagnostic system for performing an offset diagnosis of a lens drive apparatus having a control signal outputting device which outputs a control signal of a value according to a setup position of an operating member and a driving device which drives a movable optical element of the lens apparatus to be in a state corresponding to the value of the control signal, the system comprising:

a control signal detection device which detects the value of the control signal outputted by the control signal outputting device;

a follow signal outputting device which outputs a follow signal for indicating the state of the movable optical element;

a first determination device which, in the state where the operating member is set up at a setup position determined to have the movable optical element set up in a predetermined state, is adapted to determine whether or not the value of the control signal detected by the control signal detection device meets a condition of being within a range of standard values allowed as the values for setting up the movable optical element in the predetermined state;

a second determination device which, in the state where the operating member is set up at a setup position determined to have the movable optical element set up in a predetermined state, is adapted to determine whether or not the value of the follow signal outputted by the follow signal outputting device meets a condition of being within the range of the standard values allowed as the values for indicating the predetermined state of the movable optical element; and a diagnostic device adapted to indicate a normal condition in the case where both the first and second determination devices determine that the conditions are met, to indicate an abnormal condition of the control signal outputting device in the case where, of the first and second determination devices, at least the first determination device determines that the condition is not met, and diagnoses to indicate an abnormal condition of the driving device in the case where, of the first and second determination devices, only the second determination device determines that the condition is not met.

11. The lens diagnostic system as defined in claim 10, wherein the system includes a display device which displays the results of the diagnosis performed by the diagnostic device.

12. A lens diagnostic system for performing an offset diagnosis of a lens drive apparatus having a control signal outputting device which outputs a control signal of a value according to a setup position of an operating member, a signal processing device which outputs an analog voltage signal of a voltage corresponding to the value of the control signal outputted from the control signal outputting device, and an analog driving device which receives the analog voltage signal and drives a movable optical element of the lens apparatus to be in a state corresponding to the voltage of the received analog voltage signal, the system comprising:

a control signal detection device which detects the value of the control signal outputted by the control signal outputting device;

a follow signal outputting device which outputs a follow signal for indicating the state of the movable optical element;

an output voltage detection device which detects the voltage of the analog voltage signal outputted by the signal processing device;

a first determination device which, in a state where the operating member is set up at a setup position determined to have the movable optical element set up in a predetermined state, is adapted to determine whether or not the value of the control signal detected by the control signal detection device meets a condition of being within a range of standard values allowed as the values for setting up the movable optical element in the predetermined state;

a second determination device which, in the state where the operating member is set up at the setup position determined to have the movable optical element in the predetermined state, is adapted to determine whether or not the value of the follow signal outputted by the follow signal outputting device meets a condition of being within the range of the standard values allowed as the values for indicating the predetermined state of the movable optical element;

a third determination device which, in the state where the operating member is set up at the setup position determined to have the movable optical element set up in the predetermined state, is adapted to determine whether or not the voltage detected by the output voltage detection device meets a condition of being within the range of the standard values allowed as the values for setting up the movable optical element in the predetermined state; and a diagnostic device adapted to indicate a normal condition in the case where all of the first, second and third determination devices determine that the conditions are met, adapted to indicate an abnormal condition of the control signal outputting device in the case where, of the first, second and third determination devices, at least the first determination device determines that the condition is not met, adapted to indicate an abnormal condition of the signal processing device in the case where the first determination device determines that the condition is met and, of the second and third determination devices, at least the third determination device determines that the condition is not met, and adapted to indicate the abnormal condition of the driving device in the case where, of the first, second and third determination devices, only the second determination device determines that the condition is not met.

13. The lens diagnostic system as defined in claim 12, wherein the system includes a changing device which changes a correspondence between the value of the control signal and the voltage of analog voltage signal in the signal processing device so that the voltage detected by the output voltage detection device is within the range of the standard values in the case where the first determination device determines that the condition is met and, of the second and third determination devices, at least the third determination device determines that the condition is not met.

14. A controller diagnostic system comprising:

a lens apparatus, a controller which is externally connected to the lens apparatus, the controller including an operation unit to operate each drive member of the lens apparatus and outputs a control signal to operate each of the drive members of the lens apparatus, and a computer which performs communication with the lens apparatus, wherein the system is adapted to diagnose the controller with the computer, wherein the lens apparatus includes a first communication device which sends to the computer the control signal inputted from the controller when diagnosing the controller; and wherein the computer includes a second communication device which performs communication with the first communication device of the lens apparatus, a display device, a storage device which stores a diagnostic program, and a control device which executes the diagnostic program in order to diagnose the controller based on the control signal inputted from the controller via the lens apparatus so as to have diagnostic results thereof displayed on the display device.

15. The controller diagnostic system as defined in claim 14, wherein the control device includes information which operates an operating member of the controller in an interactive mode by the diagnostic program displayed on the display device.

16. The controller diagnostic system as defined in claim 15, wherein to control device is an interactive-mode control device, and the computer comprises:

a non-interactive-mode control device which executes the diagnostic program in order to have a state of the controller displayed on the display device based on the control signal inputted from the controller via the lens apparatus; and a mode switching device which switches between control by the interactive-mode control device and control by the non-interactive-mode control device.

17. The controller diagnostic system as defined in claim 16, wherein:

the diagnostic results displayed on the display device is a state of the controller.

* * * * *